United States Patent
Dong et al.

(10) Patent No.: US 11,973,178 B2
(45) Date of Patent: Apr. 30, 2024

(54) LITHIUM ION CELLS WITH HIGH PERFORMANCE ELECTROLYTE AND SILICON OXIDE ACTIVE MATERIALS ACHIEVING VERY LONG CYCLE LIFE PERFORMANCE

(71) Applicant: Zenlabs Energy, Inc., Fremont, CA (US)

(72) Inventors: Yingnan Dong, Fremont, CA (US); Subramanian Venkatachalam, Pleasanton, CA (US); Herman A. Lopez, Sunnyvale, CA (US)

(73) Assignee: Ionblox, Inc., Fremont, CA (US)

( * ) Notice: Subject to any disclaimer, the term of this patent is extended or adjusted under 35 U.S.C. 154(b) by 222 days.

(21) Appl. No.: 16/556,670

(22) Filed: Aug. 30, 2019

(65) Prior Publication Data
US 2020/0411901 A1 Dec. 31, 2020

Related U.S. Application Data

(60) Provisional application No. 62/866,978, filed on Jun. 26, 2019.

(51) Int. Cl.
| | |
|---|---|
| *H01M 10/0525* | (2010.01) |
| *H01M 4/131* | (2010.01) |
| *H01M 4/133* | (2010.01) |
| *H01M 4/134* | (2010.01) |
| *H01M 4/38* | (2006.01) |
| *H01M 4/525* | (2010.01) |
| *H01M 4/62* | (2006.01) |
| *H01M 4/02* | (2006.01) |

(52) U.S. Cl.
CPC ....... *H01M 10/0525* (2013.01); *H01M 4/131* (2013.01); *H01M 4/133* (2013.01); *H01M 4/134* (2013.01); *H01M 4/386* (2013.01); *H01M 4/525* (2013.01); *H01M 4/622* (2013.01); *H01M 2004/027* (2013.01); *H01M 2004/028* (2013.01); *H01M 2300/0031* (2013.01)

(58) Field of Classification Search
CPC ......... H01M 10/0525; H01M 10/0567; H01M 10/0568; H01M 10/0569; H01M 2004/027; H01M 2004/028; H01M 2300/0031; H01M 2300/0037; H01M 4/131; H01M 4/133; H01M 4/134; H01M 4/364; H01M 4/386; H01M 4/483; H01M 4/505; H01M 4/525; H01M 4/587; H01M 4/622; H01M 4/623; H01M 4/625
See application file for complete search history.

(56) References Cited

U.S. PATENT DOCUMENTS

| | | |
|---|---|---|
| 4,857,423 A | 8/1989 | Abraham et al. |
| 5,192,629 A | 3/1993 | Guyomard et al. |
| 5,395,711 A | 3/1995 | Tahara et al. |
| 5,422,203 A | 6/1995 | Guyomard et al. |
| 5,484,669 A | 1/1996 | Okuno et al. |
| 5,521,027 A | 5/1996 | Okuno et al. |
| 5,743,921 A | 4/1998 | Nazri et al. |
| RE35,818 E | 6/1998 | Tahara et al. |
| 5,830,600 A | 11/1998 | Narang et al. |
| 5,908,717 A | 6/1999 | Pendalwar et al. |
| 5,922,494 A | 7/1999 | Barker et al. |
| 5,994,000 A | 11/1999 | Ein-Ein et al. |
| 5,998,065 A | 12/1999 | Tsutsumi et al. |
| 6,153,338 A | 11/2000 | Gan et al. |
| 6,235,427 B1 | 5/2001 | Idota et al. |
| 6,291,107 B1 | 9/2001 | Shimizu et al. |
| 6,346,351 B1 | 2/2002 | Yde-Andersen et al. |
| 6,444,370 B2 | 9/2002 | Barker et al. |
| 6,455,200 B1 | 9/2002 | Prakash et al. |
| 6,482,549 B2 | 11/2002 | Yoshimura et al. |
| 6,492,064 B1 | 12/2002 | Smart et al. |
| 6,506,524 B1 | 1/2003 | McMillan et al. |
| 6,682,849 B2 | 1/2004 | Narang et al. |

(Continued)

FOREIGN PATENT DOCUMENTS

| | | |
|---|---|---|
| CN | 101587970 A | 11/2009 |
| CN | 105580173 A | 5/2016 |

(Continued)

OTHER PUBLICATIONS

A. Iqbal, L. Chen, Y. Chen, Y.- X. Gao, F. Chen, D.-C. Li. Lithium-ion full cell with high energy density using nickel-rich LiNi0.8Co0.1Mn0.1O2 cathode and SiO—C composite anode, Int. J. Miner. Metall. Mater., vol. 25, No. 12, Dec. 2018.*

Achiha et al., "Electrochemical Behavior of Nonflammable Organo-Fluorine Compunds for Lithium Ion Batteries," Journal of the Electrochemical Society 156(6): A483-A488 (2009).

Arai et al. "Air Product's StabiLife ™ Electrolyte Salts for Lithium Ion Batteries," Product Brochure; Air Products and Chemicals, Inc., Allentown, PA (2009).

(Continued)

*Primary Examiner* — Carlos Barcena
(74) *Attorney, Agent, or Firm* — Christensen, Fonder, Dardi PLLC; Elizabeth A. Gallo; Peter S. Dardi

(57) ABSTRACT

Improved negative electrodes can comprise a silicon based active material blended with graphite to provide more stable cycling at high energy densities. In some embodiments, the negative electrodes comprise a blend of polyimide binder mixed with a more elastic polymer binder with a nanoscale carbon conductive additive. Electrolytes have been formulated that provide for extended cycling of cells incorporating a mixture of a silicon-oxide based active material with graphite active material in negative electrodes that can be matched with positive electrodes comprising nickel rich lithium nickel manganese cobalt oxides to cells with unprecedented cycling properties for large capacity cell based on a silicon negative electrode active material.

16 Claims, 21 Drawing Sheets

(56) References Cited

U.S. PATENT DOCUMENTS

| | | | |
|---|---|---|---|
| 6,692,874 B2 | 2/2004 | Kim et al. |
| 6,746,804 B2 | 6/2004 | Gan et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,787,269 B2 | 9/2004 | Sekino et al. |
| 6,855,458 B1 | 2/2005 | Kim et al. |
| 6,884,546 B1 | 4/2005 | Fujita et al. |
| 6,942,949 B2 | 9/2005 | Besenhard et al. |
| 6,958,198 B2 | 10/2005 | Iwamoto et al. |
| 7,008,722 B2 | 3/2006 | Huang |
| 7,022,145 B2 | 4/2006 | Kim et al. |
| 7,026,074 B2 | 4/2006 | Chen et al. |
| 7,074,523 B2 | 7/2006 | Arai et al. |
| 7,172,834 B1 | 2/2007 | Jow et al. |
| 7,214,446 B1 | 5/2007 | Bi et al. |
| 7,226,704 B2 | 6/2007 | Panitz et al. |
| 7,229,717 B2 | 6/2007 | Yamaguchi et al. |
| 7,235,334 B2 | 6/2007 | Kim et al. |
| 7,255,965 B2 | 8/2007 | Xu et al. |
| 7,311,993 B2 | 12/2007 | Ivanov et al. |
| 7,348,103 B2 | 3/2008 | Ivanov et al. |
| 7,378,190 B2 | 5/2008 | Yanai et al. |
| 7,416,813 B2 | 8/2008 | Fujihara et al. |
| 7,432,015 B2 | 10/2008 | Jeong et al. |
| 7,452,632 B2 | 11/2008 | Lee et al. |
| 7,455,933 B2 | 11/2008 | Shimura et al. |
| 7,465,517 B2 | 12/2008 | Ivanov et al. |
| 7,491,471 B2 | 2/2009 | Yamaguchi et al. |
| 7,507,503 B2 | 3/2009 | Amine et al. |
| 7,510,803 B2 | 3/2009 | Adachi et al. |
| 7,700,221 B2 | 4/2010 | Yeo |
| 7,754,389 B2 | 7/2010 | Yamaguchi et al. |
| 7,794,511 B2 | 9/2010 | Wensley et al. |
| 7,923,150 B2 | 4/2011 | Yamamota et al. |
| 8,187,752 B2 | 5/2012 | Buckley et al. |
| 8,227,974 B2 | 10/2012 | Kumar et al. |
| 8,277,969 B2 | 10/2012 | Kumar et al. |
| 8,389,160 B2 | 3/2013 | Venkatachalam et al. |
| 8,394,534 B2 | 3/2013 | Lopez et al. |
| 8,399,136 B2 | 3/2013 | Ohashi et al. |
| 8,465,873 B2 | 6/2013 | Lopez et al. |
| 8,535,832 B2 | 9/2013 | Karthikeyan et al. |
| 8,663,849 B2 | 3/2014 | Ventakachalam et al. |
| 8,765,306 B2 | 7/2014 | Amiruddin et al. |
| 8,928,286 B2 | 1/2015 | Amiruddin et al. |
| 9,083,062 B2 | 7/2015 | Kumar et al. |
| 9,139,441 B2 | 9/2015 | Anguchamy et al. |
| 9,142,858 B2 | 9/2015 | Nakanishi et al. |
| 9,159,990 B2 | 10/2015 | Amiruddin et al. |
| 9,166,222 B2 | 10/2015 | Amiruddin et al. |
| 9,190,694 B2 | 11/2015 | Lopez et al. |
| 9,552,901 B2 | 1/2017 | Amiurddin et al. |
| 9,601,228 B2 | 3/2017 | Deng et al. |
| 9,780,358 B2 | 10/2017 | Masarapu et al. |
| 9,843,041 B2 | 12/2017 | Lopez et al. |
| 10,218,033 B1* | 2/2019 | Bhardwaj ......... H01M 10/0567 |
| 10,290,871 B2 | 5/2019 | Masarapu et al. |
| 10,862,126 B2 | 12/2020 | Kang et al. |
| 11,094,925 B2 | 8/2021 | Venkatachalam et al. |
| 2002/0037458 A1 | 3/2002 | Yamaguchi et al. |
| 2002/0084445 A1 | 7/2002 | Garbe |
| 2002/0102466 A1 | 8/2002 | Hwang et al. |
| 2003/0157407 A1 | 8/2003 | Kosuzu et al. |
| 2003/0165733 A1 | 9/2003 | Takehara et al. |
| 2004/0023117 A1 | 2/2004 | Imachi et al. |
| 2004/0033419 A1 | 2/2004 | Funabiki |
| 2004/0072072 A1 | 4/2004 | Suzuki et al. |
| 2004/0151951 A1 | 8/2004 | Hyung et al. |
| 2004/0214085 A1 | 10/2004 | Sheem et al. |
| 2004/0229128 A1* | 11/2004 | Noh ................. H01M 10/0569 |
| | | 429/328 |
| 2005/0008941 A1 | 1/2005 | Kim et al. |
| 2005/0019670 A1 | 1/2005 | Amine et al. |
| 2005/0031963 A1 | 2/2005 | Im et al. |
| 2005/0042520 A1 | 2/2005 | Roh et al. |
| 2005/0233207 A1 | 10/2005 | Kim |
| 2005/0233213 A1 | 10/2005 | Lee et al. |
| 2006/0040182 A1 | 2/2006 | Kawakami et al. |
| 2006/0115734 A1 | 6/2006 | Ishihara et al. |
| 2006/0172201 A1 | 8/2006 | Yasukawa et al. |
| 2006/0194119 A1 | 8/2006 | Son et al. |
| 2006/0228626 A1 | 10/2006 | Kawashima et al. |
| 2006/0269834 A1 | 11/2006 | West et al. |
| 2006/0281012 A1 | 12/2006 | Ugawa et al. |
| 2006/0286459 A1 | 12/2006 | Zhao et al. |
| 2007/0003836 A1 | 1/2007 | Suzuki et al. |
| 2007/0148549 A1 | 6/2007 | Kobayashi et al. |
| 2007/0287071 A1 | 12/2007 | Chiga et al. |
| 2008/0008933 A1 | 1/2008 | Lampe-Onnerud |
| 2008/0026297 A1 | 1/2008 | Chen et al. |
| 2008/0063945 A1 | 3/2008 | Ivanov et al. |
| 2008/0131772 A1 | 6/2008 | Jambunathan et al. |
| 2008/0131783 A1 | 6/2008 | Choi et al. |
| 2008/0193831 A1 | 8/2008 | Mah et al. |
| 2008/0226988 A1 | 9/2008 | Minami et al. |
| 2008/0254353 A1 | 10/2008 | Takezawa |
| 2008/0261115 A1 | 10/2008 | Saito et al. |
| 2009/0023065 A1 | 1/2009 | Hwang et al. |
| 2009/0092900 A1 | 4/2009 | Obana et al. |
| 2009/0111028 A1 | 4/2009 | Lee et al. |
| 2009/0117466 A1 | 5/2009 | Zhamu et al. |
| 2009/0142670 A1 | 6/2009 | Wang et al. |
| 2009/0214952 A1 | 8/2009 | Wakita et al. |
| 2009/0233178 A1 | 9/2009 | Saidi et al. |
| 2009/0239151 A1 | 9/2009 | Nakanishi et al. |
| 2009/0253042 A1 | 10/2009 | Sun et al. |
| 2009/0253046 A1 | 10/2009 | Smart et al. |
| 2009/0263721 A1 | 10/2009 | Haruna et al. |
| 2009/0297937 A1 | 12/2009 | Lampe-Onnerud et al. |
| 2009/0317721 A1 | 12/2009 | Shirane et al. |
| 2009/0317722 A1 | 12/2009 | Watanabe |
| 2010/0035147 A1 | 2/2010 | Kotato et al. |
| 2010/0086854 A1 | 4/2010 | Kumar et al. |
| 2010/0119942 A1 | 5/2010 | Kumar |
| 2010/0120179 A1 | 5/2010 | Zhamu et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0111294 A1 | 5/2011 | Lopez et al. |
| 2011/0111298 A1 | 5/2011 | Lopez et al. |
| 2011/0111304 A1 | 5/2011 | Cui et al. |
| 2011/0117446 A1 | 5/2011 | Lucht et al. |
| 2011/0136019 A1 | 6/2011 | Amiruddin et al. |
| 2011/0163274 A1 | 7/2011 | Plee et al. |
| 2011/0165474 A1 | 7/2011 | Im et al. |
| 2011/0171529 A1 | 7/2011 | Kono et al. |
| 2011/0240913 A1* | 10/2011 | Kim ...................... C01G 53/42 |
| | | 252/182.1 |
| 2011/0244331 A1 | 10/2011 | Karthikeyan et al. |
| 2012/0045670 A1 | 2/2012 | Stefan et al. |
| 2012/0070741 A1 | 3/2012 | Liu et al. |
| 2012/0070746 A1 | 3/2012 | Mikahylik et al. |
| 2012/0082877 A1 | 4/2012 | Song et al. |
| 2013/0122353 A1 | 5/2013 | Kawasaki et al. |
| 2013/0157147 A1 | 6/2013 | Li et al. |
| 2013/0224585 A1 | 8/2013 | Oh et al. |
| 2013/0295439 A1 | 11/2013 | Masarapu et al. |
| 2014/0308585 A1 | 10/2014 | Han et al. |
| 2014/0370387 A1 | 12/2014 | Anguchamy et al. |
| 2015/0037690 A1 | 2/2015 | Dalavi et al. |
| 2015/0050535 A1* | 2/2015 | Amiruddin ....... H01M 10/0525 |
| | | 429/94 |
| 2015/0086873 A1 | 3/2015 | Hotta et al. |
| 2016/0006021 A1 | 1/2016 | Lopez et al. |
| 2016/0079591 A1 | 3/2016 | Yang et al. |
| 2017/0194627 A1 | 7/2017 | Deng et al. |
| 2018/0034039 A1 | 2/2018 | Masarapu et al. |
| 2018/0034058 A1 | 2/2018 | Suh et al. |
| 2018/0062206 A1 | 3/2018 | Yang et al. |
| 2018/0108937 A1* | 4/2018 | Drach ............... H01M 10/0569 |
| 2018/0123130 A1* | 5/2018 | Kim ...................... H01M 4/366 |

(56) References Cited

U.S. PATENT DOCUMENTS

| | | | | |
|---|---|---|---|---|
| 2018/0309169 A1* | 10/2018 | Yang | ................ | H01M 10/0525 |
| 2019/0148773 A1 | 5/2019 | Kim et al. | | |
| 2019/0207209 A1 | 7/2019 | Venkatachalam et al. | | |
| 2019/0386338 A1* | 12/2019 | Kawai | ................ | H01M 10/0525 |
| 2020/0075934 A1 | 3/2020 | Wu et al. | | |
| 2022/0115703 A1* | 4/2022 | Miyachi | ................ | H01M 4/622 |

FOREIGN PATENT DOCUMENTS

| | | |
|---|---|---|
| CN | 107180955 A | 9/2017 |
| CN | 10458309 B | 10/2017 |
| CN | 109792083 A | 5/2019 |
| EP | 2079120 A1 | 1/2009 |
| JP | 09-045373 | 2/1997 |
| JP | 10-255837 | 9/1998 |
| JP | 2001-118568 | 4/2001 |
| JP | 2004-327444 A | 11/2004 |
| JP | 2005-332707 A | 12/2005 |
| JP | 2007-165111 A | 6/2007 |
| JP | 2007-250440 A | 9/2007 |
| JP | 2013-182807 A | 9/2013 |
| JP | 2016-119288 A | 6/2016 |
| JP | 2016-143642 A | 8/2016 |
| KR | 10-0493960 B1 | 9/2004 |
| KR | 10-2004-0100058 A | 12/2004 |
| KR | 10-2008-0082276 A | 9/2008 |
| KR | 2012-0073603 A | 7/2012 |
| WO | 2004-040687 A1 | 5/2004 |
| WO | 2005-083829 A2 | 9/2005 |
| WO | 2007-126257 A1 | 11/2007 |
| WO | 2008-079670 A1 | 7/2008 |
| WO | 2009-022848 A1 | 2/2009 |
| WO | 2013-082330 A1 | 6/2013 |
| WO | 2013-165767 A1 | 11/2013 |
| WO | 2015-046304 A1 | 4/2015 |
| WO | 2018-051675 A1 | 3/2018 |

OTHER PUBLICATIONS

Chen et al., "Develop & evaluate materials & additives that enhance thermal and overcharge abuse," presentation for Argonne National Laboratory, May 19, 2009.

Market Insight "Tasks of Korean rechargeable electrolyte industry," Solar & Energy Column published Dec. 27, 2010, http://www.solarenergy.com/eng/info/show.php?c_id=4899 (viewed Jun. 23, 2011).

Plichta et al., "A low-temperature electrolyte for lithium and lithium-ion batteries," Journal of Power Sources, 88: 192-196 (2000).

Schweiger et al., "Optimization of Cycling Behavior of Lithium Ion Cells at 60° C. by Additives for Electrolytes Based on Lithium bis[1,2-oxalato(2-)-O,O'] borate," Int. J. Electrochem. Sci., 3: 427-443 (2008).

Smart et al., "Performance of low temperature electrolytes in experimental and prototype Li-ion cells," 5th International Energy Conversion Engineering Conference, St. Louis, Missouri Jun. 25-27, 2007, published by NASA's Jet Propulsion Laboratory, Pasadena California, (2007) (http://hdl.handle.net/2014/41350).

Song et al., Two-and three-electrode impedance spectroscopy of lithium-ion batteries, Journal of Power Sources, 111:255-267 (2002).

Tech Briefs, "Optimized Carbonate and Ester-Based Li-Ion Electrolytes," published by NASA's Jet Propulsion Laboratory, Pasadena, California (Apr. 1, 2008). (2 pages).

Tech Briefs, "Ester-Based Electrolytes for Low-Temperature Li-Ion Cells," published by NASA's Jet Propulsion Laboratory, Pasadena, California (Dec. 1, 2005). (1 page).

"Technical Support Package for Optimized Carbonate and Ester-Based Li-Ion Electrolytes," NASA Tech Briefs NPO-44974, published by NASA's Jet Propulsion Laboratory, Pasadena, California (37 pages).

Timcal Graphite & Carbon, A Synopsis of Analytical Procedures, 2008, www.timcal.com.

International Search Report and Written Opinion from corresponding PCT Application No. PCT/US2020/038761 dated Oct. 6, 2020.

Office Action from corresponding Taiwan Patent Application No. 109210409 dated Mar. 28, 2023.

Office Action from corresponding Chinese Patent Application No. 202010044645.0 dated Jun. 5, 2023. (Google Translation).

Office Action from corresponding Japanese Patent Application No. 2021-576809 dated Oct. 30, 2023.

* cited by examiner

LITHIUM ION CELLS WITH HIGH PERFORMANCE ELECTROLYTE AND SILICON OXIDE ACTIVE MATERIALS ACHIEVING VERY LONG CYCLE LIFE PERFORMANCE

CROSS REFERENCE TO RELATED APPLICATIONS

This application claims priority to U.S. provisional patent application 62/866,978 filed on Jun. 26, 2019 to Dong et al., entitled "Lithium Ion Cells With High Performance Electroyte And Silicon Oxide Active Materials Achieving Very Long Cycle Life Performance," incorporated herein by reference.

FEDERALLY SPONSORED RESEARCH AND DEVELOPMENT

This invention was made with government support under U.S. Government Funding Agreement Number: DE-EE0006250 under the United States Advanced Battery Consortium Program Number: 18-2216-ABC awarded by the U.S. Department of Energy. The government has certain rights in the invention.

FIELD OF THE INVENTION

The invention relates to formation of cells with electrolytes that have been discovered to work with negative electrodes incorporating high capacity silicon oxide active materials while achieving good cycling capabilities.

BACKGROUND OF THE INVENTION

Lithium batteries are widely used in consumer electronics due to their relatively high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

SUMMARY OF THE INVENTION

In a first aspect, the invention pertains to a lithium ion cell comprising:
a negative electrode comprising from about 75 wt % to about 92 wt % an active material, from about 1 wt % to about 7 wt % nanoscale conductive carbon and from about 6 wt % to about 20 wt % polymer binder, wherein the active material comprises from about 35 wt % to about 95 wt % silicon oxide-based material and from about 5 wt % to about 65 wt % graphite;
a positive electrode comprising a lithium nickel cobalt manganese oxide approximately represented by the formula $LiNi_xMn_yCo_zO_2$, where $x+y+z\approx1$, $0.3\leq x$, $0.025\leq y\leq 0.35$, $0.025\leq z\leq 0.35$, conductive carbon, and a polymer binder;
a separator between the negative electrode and the positive electrode;
electrolyte comprising from about 1M to about 2M lithium salt and non-aqueous solvent, wherein the non-aqueous solvent comprises at least about 5 volume percent fluoroethylene carbonate and at least about 25 volume percent combined amount of dimethyl carbonate, methylethyl carbonate and diethyl carbonate; and
a container enclosing the other cell components.

In a further aspect, the invention pertains to a lithium ion cell comprising:
a negative electrode comprising from about 75 wt % to about 92 wt % an active material, from about 1 wt % to about 7 wt % nanoscale conductive carbon and from about 6 wt % to about 20 wt % polymer binder, wherein the active material comprises from about 40 wt % to about 95 wt % silicon oxide-based material and from about 5 wt % to about 60 wt % graphite;
a positive electrode comprising a nickel-rich lithium nickel cobalt metal oxide, conductive carbon, and a polymer binder, where the nickel-rich lithium metal cobalt oxide is approximately represented by the formula $LiNi_xM_yCo_zO_2$, where $x+y+z\approx1$, $0.3\leq x$, $0.025\leq y\leq 0.35$, $0.025\leq z\leq 0.35$ and M is Mn, Al, Mg, Sr, Ba, Cd, Zn, Ga, B, Zr, Ti, Ca, Ce, Y, Nb, Cr, Fe, V, or combinations thereof;
a separator between the negative electrode and the positive electrode;
electrolyte comprising from about 1M to about 2 M lithium salt and non-aqueous solvent, wherein the non-aqueous solvent comprises at least about 5 volume percent fluoroethylene carbonate and at least about 25 volume percent combined amount of dimethyl carbonate, methylethyl carbonate and diethyl carbonate; and
a container enclosing the other cell components.

In some embodiments, the lithium ion cell can be cycled at a charge rate of 1C and a discharge rate of 1C for at least about 700 cycles without a drop in capacity of more than 20% relative to the 3rd cycle capacity.

DETAILED DESCRIPTION OF THE INVENTION

Figure 1:
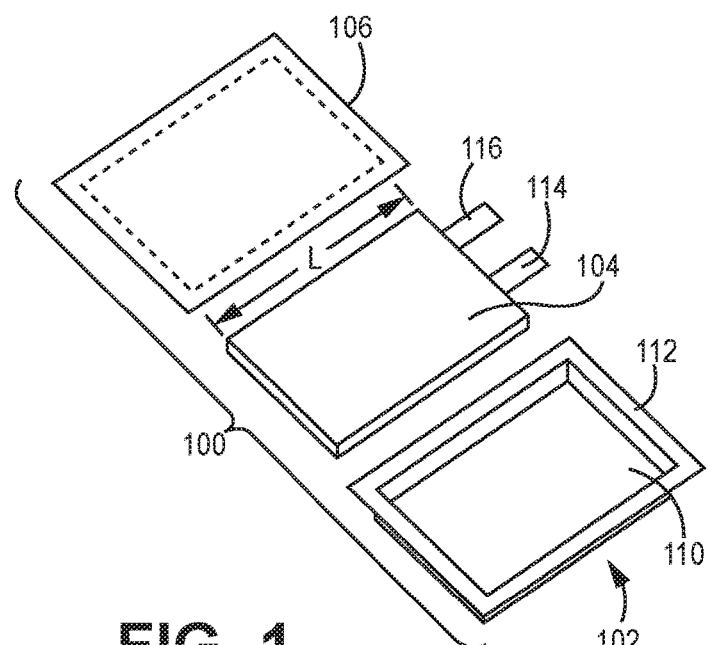
FIG. 1 is an expanded view of a pouch battery with a battery core separated from two portions of the pouch case.

New electrolyte compositions have been discovered that provide unprecedented cycling performance for batteries comprising negative electrode with substantial amounts of silicon based active material to achieve high specific capacities. This achievement builds on earlier work that have provided substantial improvements in negative electrode design that provided a significant leap in cycling performance. The new electrolyte formulations use significant amounts of fluoroethylene carbonate solvent and exclude other unstable components and appropriately select the other solvent components to provide the achieved stabilities. In the negative electrodes, the active material can be engineered to include a blend with a silicon based active material, such as silicon oxide, but with a significant component of graphite. Furthermore, the binder characteristics have been found to also make a significant contribution to the cycling stability. In the earlier work cycling was obtained out to more than 600 cycles before reaching 80% of initial capacity for reasonable discharge rates and with high specific capacity. With the further improved work here, cycling has been obtained to more than 800 cycles before reaching 80% of initial capacity at reasonable discharge rates and with high specific capacity. The cycling performance improvement is an important achievement for use of the batteries for electric vehicle use.

Lithium has been used in both primary and secondary batteries. An attractive feature of lithium for cell or battery use is its light weight and the fact that it is the most electropositive metal, and aspects of these features can be advantageously captured in lithium-based batteries also. Certain forms of metals, metal oxides, and carbon materials are known to incorporate lithium ions from the electrolyte into its structure through intercalation, alloying or similar mechanisms. The positive electrode of a lithium based battery generally comprises an active material that reversibly intercalates/alloys with lithium. Lithium ion cells generally refer to cells in which the negative electrode active material is also a lithium intercalation/alloying material. As used herein and for convenience, the terms cell and battery as well as variations thereof are used interchangeably unless some explicit distinction is recited.

The batteries described herein are lithium ion batteries that use a non-aqueous electrolyte solution which comprises lithium cations and suitable anions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, during charge, reduction takes place at the anode (negative electrode) where lithium ions are taken up and electrons are consumed, and during discharge, oxidation takes place at the anode with lithium ions and electrons being released. Unless indicated otherwise, performance values referenced herein are at room temperature, i.e., about 23±2° C.

The word "element" is used herein in its conventional way as referring to a member of the periodic table in which the element has the appropriate oxidation state if the element is in a composition and in which the element is in its elemental form, $M^0$, when stated to be in an elemental form. Therefore, a metal element generally is only in a metallic state in its elemental form or an appropriate alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change with cycling. However, the capacity of the active materials is observed to decrease with cycling to varying degrees. Thus, after a number of cycles, the performance of the cell falls below acceptable values, and the cell is replaced. Also, on the first cycle of the cell, generally there is an irreversible capacity loss that is significantly greater than per cycle capacity loss at subsequent cycles. The irreversible capacity loss (IRCL) is the difference between the charge capacity of the new cell and the first discharge capacity. Positive electrodes based on lithium metal oxides can exhibit some IRCL which results in some compensation for the negative electrode with respect to lithium available for cycling. The irreversible capacity loss can result in a corresponding decrease in the capacity, energy and power for the cell due to changes in the cell materials during the initial cycle.

Elemental silicon as well as other silicon based active materials have attracted significant amount of attention as a potential negative electrode material due to silicon's very high specific capacity with respect to intake and release of lithium. Elemental silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed, and the large volume changes have been correlated with a significant decrease in the cycling stability of batteries having silicon-based negative electrodes. Silicon suboxides, i.e., $SiO_x$, x<2, have also been found to be desirable active materials for lithium based batteries, which can have in some embodiments high specific capacities with respect to lithium alloying. The reference to silicon suboxide provides acknowledgement of silicon dioxide as the fully oxidized form of silicon. For convenience, silicon suboxide may be generally referred to as silicon oxide, which is not limited to silicon monoxide (SiO) unless specifically indicated.

In embodiments of particular interest, the silicon based active materials can comprise elemental silicon and/or silicon suboxide as a primary active material. Silicon suboxide has been found particularly effective to achieve longer cycling stability. To stabilize the silicon based active materials as well as to increase electrical conductivity, carbon can be incorporated into a composite active material. With respect to carbon composites with nanoscale elemental silicon and/or silicon oxide, long cycling stability has remained elusive, although Applicant has achieved moderate cycling stability for consumer electronics applications. Longer cycling stability is described herein based on mixtures of electroactive graphite and silicon based composites along with other electrode design improvements. As discussed in detail below, the stabilized silicon based electrodes can further comprise additional conductive sources, such as nanoscale carbon as well as improved binder blends that also contribute significantly to cycling stability.

While improved electrode design has significantly improved cycling performance, it has been discovered that further cycling stabilization can be achieved due to improved electrolyte formulation. The improved electrolytes are based on solvents comprising at least 5 volume percent fluoroethylene carbonate and at least 25 volume percent of dimethyl carbonate, ethylmethyl carbonate, diethyl carbonate, or a mixture thereof. In addition, in some embodiments, the electrolytes should be essentially free of ethylene carbonate. The electrolytes further comprise from about 1M to about 2M of an electrolyte salt.

Fluorinated solvents have been found to be useful in particular for silicon based active materials. Previous results have been obtained with a commercial electrolyte comprising a proprietary fluorinated solvent, as described in copending U.S. patent application Ser. No. 15/948,160 to Venkatachalam. et al. now published as US 2019/0207209A1 (hereinafter the '209 application), entitled "Electrodes with Silicon Oxide Active materials for Lithium Ion Cells Achieving High Capacity, High Energy Density and Long Cycle Life Performance," incorporated herein by reference. The use of fluoroethylene carbonate as a suitable solvent for low temperature cell performance was recognized in published U.S. patent application 2013/0157147 to Li et al. (hereinafter the '147 application), entitled "Low Capacity Electrolyte for High Capacity Lithium Based Batteries," incorporated herein by reference.

The effects of the use of fluoroethylene carbonate on the formation of solid electrolyte interphase layers is described in Markevich et al., "Fluoroethylene Carbonate as an Important Component for the Formation of an Effective Solid Electrolyte Interphase on Anodes and Cathodes for Advanced Li-Ion Batteries," ACS Energy letters 2017, 2, 1137-1345, incorporated herein by reference. The Markevich article suggest utility for silicon nanowire based anodes. The main focus of the Markevich article is the use with high voltage cathodes in comparison with ethylene carbonate based electrolytes. The work herein extends the earlier work of the '147 application in combination with excellent electrode formation to achieve unprecedented silicon based cell performance. In particular, the present work demonstrates the effective use of FEC based electrolytes for silicon oxide/graphite blend anodes with high loading and commercially suitable electrode designs.

The active materials for lithium ion secondary cells herein generally include, for example, a positive electrode (i.e., cathode) active material with a moderately high average voltage against lithium and a silicon based active material for the negative electrode (i.e., anode). In general, various cathode materials can be used. For example, commercially available cathode active materials can be used with existing commercial production availability. Such cathode active materials include, for example, lithium cobalt oxide (LiCoO$_2$), LiNi$_{1/3}$Mn$_{1/3}$Co$_{1/3}$O$_2$ (L333 or NMC111), LiNiCoAlO$_2$ (NCA), other lithium nickel manganese cobalt oxides (NMC), LiMn$_2$O$_4$ (lithium manganese oxide spinel), modified versions thereof, or mixtures thereof.

Nickel rich-lithium nickel cobalt manganese oxides (LiNi$_x$Mn$_y$Co$_z$O$_2$, 0.45≤x, 0.05≤y, z≤0.35) can be of interest due to lower costs and lower flammability risk relative to lithium cobalt oxide as well as the ability to cycle at higher voltages. Results are presented with the nickel rich-lithium nickel manganese cobalt oxide active materials paired with the improved silicon based negative electrodes to form cell with excellent cycling stability. Also, lithium metal oxide materials with a high specific capacity, which have a layered crystal structure and are lithium rich relative to a LiMO$_2$ (M=non-lithium metal) reference composition, are described, for example, in U.S. Pat. No. 8,389,160 to Venkatachalam et al. (hereinafter the '160 patent), entitled "Positive Electrode Materials For Lithium Ion Batteries Having a High Specific Discharge Capacity And Processes for the Synthesis of These Materials," and U.S. Pat. No. 8,465,873 to Lopez et al (hereinafter the '873 patent), entitled "Positive Electrode Materials for High Discharge Capacity Lithium Ion Batteries," both of which are incorporated herein by reference. These materials can be referred to as high capacity manganese rich compositions (HCMR™). Also, a blend of the lithium rich+manganese rich NMC and the nickel rich-NMC positive electrode active compositions can be used.

Specifically, desirable cycling results can be obtained from nickel-rich-lithium nickel manganese cobalt oxide (N-NMC), which can be represented by the formula LiNi$_x$Mn$_y$Co$_z$O$_2$, with x≥0.3 and x+y+z≈1. Commercially available formulations of these compounds include, for example, LiNi$_{0.33}$Mn$_{0.33}$Co$_{0.33}$O$_2$ (BASF and Targray (Canada)), LiNi$_{0.5}$Mn$_{0.3}$Co$_{0.2}$O$_2$ (BASF), LiNi$_{0.6}$Mn$_{0.2}$Co$_{0.2}$O$_2$ (Targray (Canada), Umicore (Belgium), and L&F Company (Korea)), LiNi$_{0.8}$Mn$_{0.1}$Co$_{0.1}$O$_2$ (Targray, Canada, LG Chemical, Umicore (Belgium) and L&F Company (Korea)). In the industry, both NCM and NMC are currently used interchangeably with the cobalt and manganese listed in the corresponding order, and at this time the presentations are equivalent and just based on a personal preference.

As noted above, silicon based electrodes provide challenges with respect to obtaining suitable cycling for commercial applications. For consumer electronic applications, a reasonable cycling target can be roughly 250-450 cycles without an unacceptable loss of performance, but for vehicle and similar larger capacity applications, a greater cycling stability is desired. Applicant has achieved suitable cell designs for consumer electronics applications that can achieve appropriate performance using silicon based anodes. These batteries are described in published U.S. patent application 2015/0050535 to Amiruddin et al. (hereinafter the '535 application), entitled "Lithium Ion Batteries With High Capacity Anode Material and Good Cycling for Consumer Electronics," incorporated herein by reference. The new electrode designs herein provide for cycling beyond the target cycling stabilities for consumer electronics and achieve suitable performance for vehicle and other high capacity applications.

As with silicon, oxygen deficient silicon oxide, e.g., silicon oxide, SiO$_x$, 0.1≤x≤1.9, can intercalate/alloy with lithium such that the oxygen deficient silicon oxide can perform as an active material in a lithium based cell. The silicon oxide can incorporate a relatively large amount of lithium such that the material can exhibit a large specific capacity. However, silicon oxide is also observed generally to have a capacity that fades relatively quickly with cell cycling. Commercial silicon based material comprising SiO, which from some suppliers may be in a composite with carbon and silicon nanocrystals, is available from Alfa Aesar (USA), Sigma-Aldrich (USA), Shin-Etsu (Japan), Osaka Titanium Corporation (Japan), and Nanostructured and Amorphous Materials Corp. (USA). Additional specific suitable formulations of the silicon based compositions are described further below. Applicant has achieved cycling stabilization of silicon oxide based active materials using the electrode formulations described herein. In some embodiments, it can be desirable to have negative electrodes comprising a combination of graphitic carbon active material and silicon based active material to extend cycling life with an acceptable decrease in specific capacity, and the superior cycling performance herein uses such active material blends.

To achieve the results described herein, negative electrodes include several improvements in design, which can be considered individually or combined to provide improved cycling performance, and at least for some embodiments the combination of specific electrode features can provide surprising synergistic performance improvements for longer cycling stability. The electrolytes described herein take further advantage of these electrode improvements. In particular, the negative electrodes can be designed with a composite binder having a high tensile strength while introducing some elongation capability. Nanoscale conductive carbon, such as carbon nanotubes, carbon black, carbon nanofibers, or combinations thereof, as an electrically conductive electrode additive have been found to improve cycling of the negative electrodes with the silicon based active material. These features can be combined with a design of electrode loading and density that provides good energy densities based performance for the resulting consumer electronics cell designs. The cycling can be further improved with the addition of supplemental lithium into the cell and/or with an adjustment of the balance of the active materials in the respective electrodes.

The graphite component of the active material blends in the negative electrodes can provide electrical conductivity. Nevertheless, it is found that an appropriate amount of nanoscale carbon can further stabilize the negative electrodes with respect to cycling. Nanoscale carbon can take the form of carbon nanotubes, carbon nanofibers, or carbon nanoparticles, such as carbon black. The usefulness of nanoscale conductive carbon for cycling stability of silicon based negative electrodes was previously discovered as described in U.S. Pat. No. 9,190,694B2 to Lopez et al., entitled "High Capacity Anode Materials for Lithium Ion Batteries," and U.S. Pat. No. 9,780,358B2 to Masarapu et al., entitled "Battery Designs With High Capacity Anode Materials and Cathode Materials," both of which are incorporated herein by reference. Generally, the electrodes comprise at least about 1 wt percent nanoscale conductive carbon to achieve stable cycling.

In a lithium ion cell, reactive lithium for cycling is generally provided in the positive electrode active material, which is transferred to the negative electrode during the initial charge of the cell where it is then available for discharge of the cell. The silicon based negative electrodes generally can exhibit a large irreversible capacity loss during the first charge of the cell. The loss of capacity can generally be associated with corresponding irreversible changes to the materials during the initial charge of the cell. For example, a solid electrolyte interphase (SEI) layer forms in association with the negative electrode active material as a result of reactions with typical electrolytes used in the cells. The SEI layer can stabilize the cell during cycling if a stable SEI layer is formed. Presumably other irreversible changes take place with respect to the silicon based active composition. The first cycle irreversible capacity loss is generally significantly larger than any per cycle loss of capacity associated with subsequent cycling of the cell, although the second, third and a few additional cycles may still have greater per cycle capacity loss due to a carryover of initial changes into the first few cycles rather than being fully accomplished in the first cycle. A relatively large irreversible capacity loss (IRCL) can decrease the cycling capacity as well as the energy output and power output of the cell during cycling. In larger format cells, capacity can increase at lower numbers of cycles, due to practical effects, which may be, for example, improved permeation of the electrolyte through an electrode stack.

To reduce the loss of energy output and power output of the cell as a result of the irreversible capacity loss, supplemental lithium can be included to provide additional lithium into the cell. The introduction of supplemental lithium can reduce the introduction of cathode active material that does not cycle due to loss of active lithium capacity associated with the IRCL. Supplemental lithium refers to active lithium that is introduced directly or indirectly into the cell, distinct from the positive electrode active material, to replace lithium lost to irreversible processes as well as to provide other beneficial effects. Applicant has discovered that supplemental lithium provided in greater amounts than corresponding to compensation for irreversible capacity loss can further stabilize cycling. In the context of lithium rich+manganese rich nickel manganese cobalt oxides, positive electrode active materials, this cycling stabilization is described in U.S. Pat. No. 9,166,222 to Amiruddin et al (hereinafter the '222 patent), entitle "Lithium Ion Batteries With Supplemental Lithium," incorporated herein by reference.

Various approaches for the introduction of supplemental lithium can be used including, for example, addition of a lithium active material (e.g. lithium metal powder or foil) to the negative electrode, addition of a sacrificial lithium source to the positive electrode, inclusion of a sacrificial lithium electrode to the cell structure, electrochemical prelithiation of the negative electrode, or the like. These approaches are described further in the '222 patent and U.S. Pat. No. 9,190,694 to Lopez et al. (hereinafter the '694 patent), entitled "High Capacity Anode Materials for Lithium Ion Batteries," both of which are incorporated herein by reference. In some embodiments, it has been found that an electrochemical approach can be convenient, such as the approach described in published PCT application, WO 2013/082330 to Grant et al., entitled "Method for Alkylating Anodes," incorporated herein by reference. In general, the supplemental lithium can be introduced in a quantity to compensate for a portion of the irreversible capacity loss, approximately all of the irreversible capacity loss, or a greater amount than the irreversible capacity loss, but generally no more than 30% of the capacity of the negative electrode active material above the irreversible capacity loss. In some embodiments, the supplemental lithium can compensate for from about 90% to about 200% of the anode first cycle irreversible capacity loss.

Applicant's previous work has found that cycling of silicon based anodes is significantly facilitated by the use of a high tensile strength polymer binder, which can be satisfied by appropriate polyimides. Specifically, the polymer binder can have a tensile strength of at least about 60 MPa. For extending the cycling stability even longer, it was discovered that a polymer binder blend may provide further improved cycling performance. One component of the polymer binder blend can be a high tensile strength polymer, such as polyimide, and the second polymer can have a lower value of Young's modulus (elastic modulus) to provide a more elastic polymer, such as polyvinylidene fluoride, carboxymethyl cellulose, styrene-butadiene rubber, lithiated polyacrylic acid, or mixtures thereof. While providing tensile strength, the polymer binder should also provide good adhesion such that the electrode remains laminated to the current collector. The desired blends can comprise at least about 50 wt % high tensile strength polymer and at least about 5 wt % polymer binder with a Young's modulus of no more than about 2.4 GPa and for some embodiments an elongation of at least about 35%.

The anode design generally involves a balance of factors to achieve target capacities while still providing for reasonable cycling. The incorporation of the desirable electrolytes herein has significantly further extended the cycling stabilities. As seen in results in the Examples below, the batteries with silicon based anode active materials have been able to cycle for over seven hundred and fifty cycles while maintaining over 80% of the cell capacity. At the same time, the realistic negative electrode design can be matched up with reasonable positive electrode designs to achieve good cycling as well as high values of energy density. Electrode designs are described in detail below as well as the balance of design features to achieve these accomplishments.

In general, the electrode designs described herein can be adapted for cylindrical cells or more rectangular or prismatic style batteries. Cylindrical batteries generally have wound electrode structures while prismatic shaped batteries can have either wound or stacked electrodes. In general, to achieve desired performance capacities with appropriate electrode design with respect to electrode loadings and densities, the cell can comprise a plurality of electrodes of each polarity that can be stacked with separator material between electrodes of a cell. Winding of the electrodes can provide a similar effect with a reasonable internal resistance due to electron conductivities and ion mobilities as well as good packing of the electrodes within an appropriate container. The size of the batteries generally affects the total capacity and energy output of the cell. The designs described herein are based on obtaining desirably high energy density while providing desirable cycling of the cell based on a silicon based active material.

Through the discovery of improved electrolyte formulations, significant extension of cycling stability has been obtained. In particular, cells with significant fractions of silicon based active material have been cycled for at least 800 cycles without a drop in capacity to values below 80% of the third cycle capacity at discharge rates of C. The cycling stabilities obtained are suitable for use in electric vehicle applications and similar high capacity uses.

General Battery Features The negative electrode and positive electrode structures can be assembled into appropriate cells. As described further below, the electrodes are generally formed in association with current collectors to form electrode structures. A separator is located between a positive electrode and a negative electrode to form a cell. The separator is electrically insulating while providing for at least selected ion conduction between the two electrodes. A variety of materials can be used as separators. Some commercial separator materials can be formed from polymers, such as polyethylene and/or polypropylene that are porous sheets that provide for ionic conduction. Commercial polymer separators include, for example, the Celgard® line of separator material from Asahi Kasei (Japan) Also, ceramic-polymer composite materials have been developed for separator applications. These ceramic composite separators can be stable at higher temperatures, and the composite materials can reduce the fire risk. Polymer-ceramic composites for lithium ion battery separators are sold under the trademark Separion® by Evonik Industries, Germany and Lielsort® by Tiejin Lielsort Korea Co., Ltd. Also, separators can be formed using porous polymer sheets coated with a gel-forming polymer. Such separator designs are described further in U.S. Pat. No. 7,794,511 B2 to Wensley et al., entitled "Battery Separator for Lithium Polymer Battery," incorporated herein by reference. Suitable gel-forming polymers include, for example, polyvinylidene fluoride (pvdf), polyurethane, polyethylene oxide (PEO), polypropylene oxide (PPO), polyacylonitrile, gelatin, polyacrylamide, polymethylacrylate, polymethylmethacrylate, polyvinylacetate, polyvinylpyrrolidone, polytetraethylene glycol diacrylate, copolymers thereof, and mixtures thereof.

Electrolyte provides for ion transport between the anode and cathode of the battery during the charge and discharge processes. The electrolytes for lithium ion batteries incorporate non-aqueous solvents and lithium salts. Improved electrolytes for silicon based electrodes are described in detail below. The electrolytes generally are infused into the cell prior to sealing the case.

The electrodes described herein can be assembled into various commercial cell/battery designs such as prismatic shaped batteries, wound cylindrical cells, coin cells, or other reasonable cell/battery designs. The cells can comprise a single pair of electrodes or a plurality of pairs of electrodes assembled in parallel and/or series electrical connection(s). Electrode stacks can have an extra electrode to end the stack with the same polarity as the other end of the stack for convenience in placement in a container. While the electrode structures described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the cell structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the cell. Some presently used rechargeable commercial cells include, for example, the cylindrical 18650 cells (18 mm in diameter and 65 mm long) and 26700 cells (26 mm in diameter and 70 mm long), although other cell/battery sizes can be used, as well as prismatic cells and foil pouch cells/batteries of selected sizes.

Pouch batteries can be particularly desirable for various applications, including certain vehicle applications, due to stacking convenience and relatively low container weight. A pouch battery design for vehicle batteries incorporating a high capacity cathode active material is described further in U.S. Pat. No. 8,187,752 to Buckley et al, entitled "High Energy Lithium Ion Secondary Batteries" and U.S. Pat. No. 9,083,062B2 to Kumar et al., entitled "Battery Packs for Vehicles and High Capacity Pouch Secondary Batteries for Incorporation into Compact Battery Packs," both incorporated herein by reference. While the pouch battery designs are particularly convenient for use in specific battery pack designs, the pouch batteries can be used effectively in other contexts as well.

Figure 2:
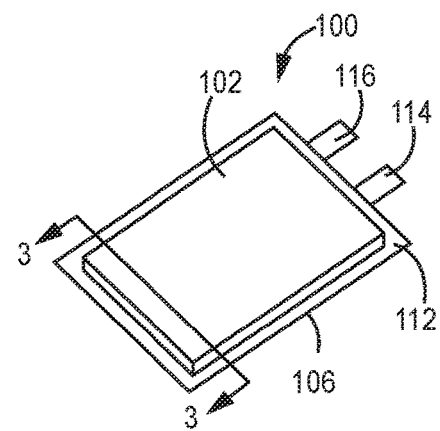
FIG. 2 is a perspective lower face view of the assembled pouch battery of FIG. 1.
Figure 3:
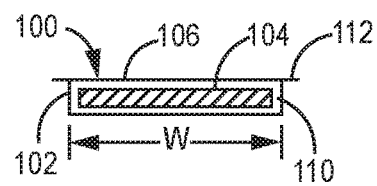
FIG. 3 is a bottom plan view of the pouch battery of FIG. 2.

A representative embodiment of a pouch battery is shown in FIGS. 1 to 4. In this embodiment, pouch battery 100 comprises pouch enclosure 102, electrode core 104 and pouch cover 106. An electrode core is discussed further below. Pouch enclosure 102 comprises a cavity 110 and edge 112 surrounding the cavity. Cavity 110 has dimensions such that electrode core 104 can fit within cavity 110. Pouch cover 106 can be sealed around edge 112 to seal electrode core 104 within the sealed battery, as shown in FIGS. 2 and 3. Terminal tabs 114, 116 extend outward from the sealed pouch for electrical contact with electrode core 104. FIG. 3 is a schematic diagram of a cross section of the battery of FIG. 2 viewed along the 3-3 line. Many additional embodiments of pouch batteries are possible with different configurations of the edges and seals.

Figure 4:
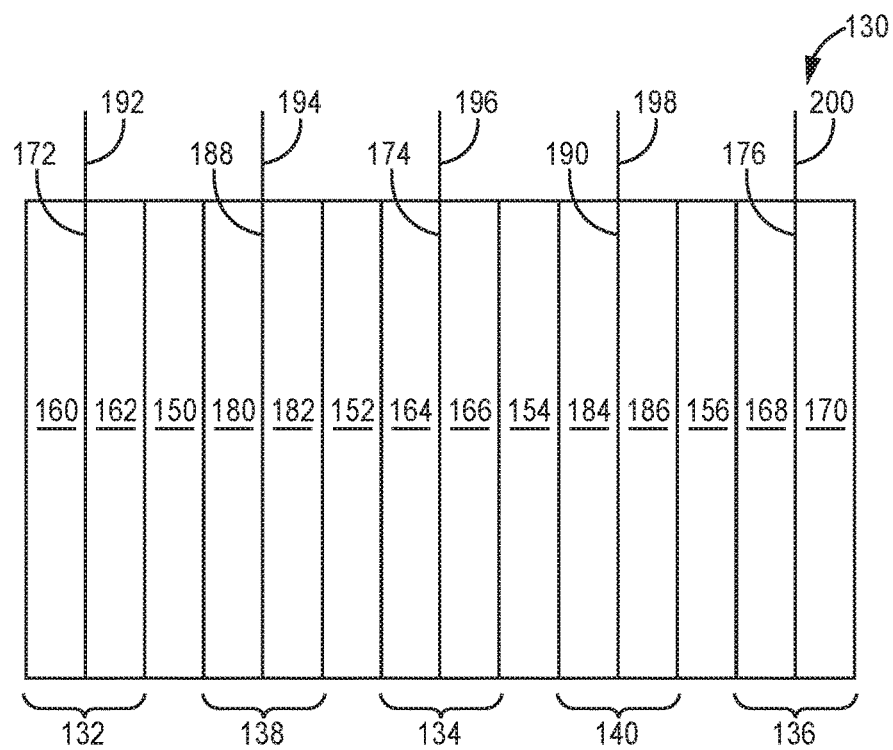
FIG. 4 is depiction of an embodiment of a battery core comprising an electrode stack.

FIG. 4 shows an embodiment of an electrode core 104 that generally comprise an electrode stack. In this embodiment, electrode stack 130 comprises negative electrode structures 132, 134, 136, positive electrode structures 138, 140, and separators 150, 152, 154, 156 disposed between the adjacent positive and negative electrodes. The separator can be provided as a single folded sheet with the electrode structures placed in the separator folds. Negative electrode structures 132, 134, 136 comprise negative electrodes 160, 162, negative electrodes 164, 166 and negative electrodes 168, 170, respectively, disposed on either side of current collectors 172, 174, 176. Positive electrode structures 138, 140 comprise positive electrodes 180, 182 and positive electrodes 184, 186, respectively, disposed on opposite sides of current collectors 188, 190, respectively. Tabs 192, 194, 196, 198, 200 are connected to current collectors 172, 188, 174, 190, 176, respectively, to facilitate the connection of the individual electrodes in series or in parallel. For vehicle applications, tabs are generally connected in parallel, so that tabs 192, 196, 200 would be electrically connected to an electrical contact accessible outside the container, and tabs 194, 198 would be electrically connected to an electrical contact as an opposite pole accessible outside the container.

Electrode stacks can have an extra negative electrode such that both outer electrodes adjacent the container are negative electrodes. Generally, a battery with stacked electrodes of the dimensions described herein have from 5 to 40 negative electrode elements (current collector coated on both sides with active material) and in further embodiments from 7 to 35 negative electrode elements with corresponding numbers of positive electrode elements being generally one less than the negative electrode elements. A person of ordinary skill in the art will recognize that additional ranges of electrode numbers within the explicit ranges above are contemplated and are within the present disclosure.

As noted above, wound electrodes can be correspondingly used for either a cylindrical battery or a roughly prismatic shaped battery. Wound cells for cylindrical lithium ion batteries are described further in U.S. Pat. No. 8,277,969 to Kobayashi et al., entitled "Lithium Ion Secondary Battery," incorporated herein by reference. Prismatic shaped batteries with wound electrodes are described in U.S. Pat. No. 7,700,221 to Yeo (the '221 patent), entitled "Electrode Assembly and Lithium Ion Secondary Battery Using the Same," incorporated herein by reference. The Kobayashi '969 patent and the Yeo '221 patent do not describe how to achieve reasonable cycling or a high energy density with silicon based active materials. Designs for prismatic shaped batteries with wound electrodes are described further, for example, in the '221 patent cited above. A particular design of either a stacked set of electrodes or a wound cell can be influenced by the target dimensions and the target capacity of the battery.

The improved negative electrodes can be used for a range of applications and cell/battery designs. For electrode stacks, the areas of the electrodes can be selected reasonably based on the volume and design constraints for the particular application. The following discussion focuses on larger cells generally designed for vehicle applications, such as drones, automobiles, trucks, or other vehicles. However, the improved negative electrodes described herein can be effectively used for consumer electronics applications, which can be based on smaller cell formats. Also, it should be noted that vehicles can use smaller consumer electronics cells, and Tesla cars presently are famous for using thousands of small consumer electronics cells in their battery packs. Generally, larger format cells/batteries can achieve larger energy densities within certain ranges. It may be desirable to select positive electrode active materials based on the particular application to balance various considerations, such as energy densities.

With the selection of electrode parameters, the design of high gravimetric energy density cells can incorporate a balance of factors including electrode area, the number of electrode structures, and battery capacity. The electrode area refers to the spatial extent of one of the electrodes along one side of a current collector. FIG. 1 depicts the length "L", and FIG. 3 depicts the width "W" of an electrode. As shown in the figures, the area of an electrode can be defined as L×W. In some embodiments, the area of each electrode can be similar such that the dimensions of a battery comprising an electrode stack can have a length and width that are similar to the length and width of each electrode in the stack. In some embodiments, the separator can be in sheets with an area slightly larger than the area of the electrode, and in some embodiments, the separator can be folded, pleated or formed with pockets in which the electrodes are placed in folds or the pocket of the separator.

Electrolytes

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts a non-aqueous solvent and optional additives. The desired electrolytes to achieve the unprecedented cycling described herein have appropriately selected solvents and specifically avoided ingredients that have been found to degrade cycling performance.

Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. Lithium hexafluoro phosphate and lithium tetrafluoroborate are of particular interest. In some embodiments, the electrolyte comprises from about 1 M to about 2 M concentration of the lithium salts, in further embodiments from about 1.1 M to about 1.9 M, and in other embodiments from about 1.25 M to about 1.8 M lithium salt. A person of ordinary skill in the art will recognize that additional ranges of electrolyte salt concentrations within the explicit ranges above are contemplated and are within the present disclosure.

For lithium ion batteries of interest, a non-aqueous liquid is generally used to dissolve the lithium salt(s) in a non-aqueous solvent. The solvent generally does not dissolve the electroactive materials. The solvent selection is significant for the electrolytes described herein that provide for the surprisingly improved cycling performance. Generally, the solvent comprises from about 5 weight percent to about 30 weight percent fluoroethylene carbonate (FEC), in further embodiments from about 7 wt % to about 27 wt % and in additional embodiments from about 8 wt % to about 25 wt % FEC. Correspondingly, the solvent is generally substantially free of ethylene carbonate since ethylene carbonate has been found to be detrimental for cycling. Ethylene carbonate is a room temperature solid with a melting point at around 35° C. Fluoroethylene carbonate melts around room temperature, 18-23° C. Also, electrolytes with fluoroethylene carbonate have been found to have excellent low temperature performance as described in the '147 application cited above.

The electrolyte solvents generally also comprise room temperature liquid components, and the solvents of particular interest further comprise linear carbonate esters and optional additives. Desirable linear carbonate esters include, for example, dimethyl carbonate, ethylmethyl carbonate and diethyl carbonate. In some embodiments, the total volume contributed to the solvent by the dimethyl carbonate, ethylmethyl carbonate, and diethyl carbonate can be from about 50 volume percent to about 95 volume percent, in further embodiments from about 55 volume percent to about 92.5 volume percent and in additional embodiments from about 60 volume percent to about 91 volume percent combined contributions from dimethyl carbonate, ethylmethyl carbonate and diethyl carbonate. In some embodiment, the solvent consists essentially of fluoroethylene carbonate and one or more of dimethyl carbonate, ethylmethyl carbonate and diethyl carbonate. A person of ordinary skill in the art will recognize that additional ranges of solvent components within the explicit ranges above are contemplated and are within the present disclosure.

In some embodiments, the solvent can further comprise propylene carbonate and/or fluorobenzene. If either or both of these optional solvent components are present, the solvent can generally comprise independently from about 0.5 volume percent to about 12 volume percent, in further embodiments from about 0.75 to about 10 volume percent, and other embodiments form about 1 vol % to about 8 vol % of one or both of these solvent components. While the PC or FB solvent components do not significantly alter the cycling performance, these solvent components can be desirable for processing advantages, such as reducing gas formation. A person of ordinary skill in the art will recognize that additional ranges of PC and/or FB solvent concentrations within the explicit ranges above are contemplated and are within the present disclosure.

Generally, the solvent may comprise other minor components generally at no more than about 20 volume percent total of these other solvent components, in some embodiments no more than about 10 volume percent, in other embodiments from about 0.01 volume percent to about 5 volume percent, and in further embodiments from about 0.1 volume percent to about 1 volume percent. A person of ordinary skill in the art will recognize that additional ranges of solvent components within the explicit ranges above are contemplated and are within the present disclosure. In some embodiments, other appropriate solvent ingredients that may optionally be present in minor amounts include, for example, 2-methyl tetrahydrofuran, dioxolane, tetrahydrofuran, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Other minor fluorinated solvent components can include, for example, fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl) carbonate, bis(2,2,3,3,3-pentafluoro-propyl) carbonate, or mixtures thereof. Additional fluorinated minor solvent components include, for example, fluorinated ethers, as described in published U.S. patent application 2018/0062206 to Li et al., entitled "Fluorinated Ether as Electrolyte Co-Solvent for Lithium Metal Based Anode," and WO 2018/051675 to Takuya et al. entitled "Lithium Secondary Battery," both of which are incorporated herein by reference.

A common solvent compound that is generally considered a desirable solvent component for lithium ion cells have been found to be detrimental to cycling for the improved electrodes described herein. Specifically, ethylene carbonate is generally excluded from the electrolytes described herein. Thus, the electrolytes generally comprise no more than 0.1 volume percent of ethylene carbonate Electrode Structures The electrodes of the cell comprise the active material along with a binder and conductive additives. The electrodes are formed into a sheet, dried and pressed to achieve a desired density and porosity. The electrode sheets are generally formed directly on a metal current collector, such as a metal foil or a thin metal grid. For many cell structures, electrode layers are formed on both sides of the current collector to provide for desirable performance in the assembled cell or battery. The electrode layers on each side of the current collector can be considers elements of the same electrode structure since they are at the same potential in the cell, but the current collector itself, while part of the electrode structure is not generally considered part of the electrode since it is electrochemically inert. Thus, references to the physical aspects of an electrode generally refer to one layer of electrode composition within the electrode structure. An electrically conductive current collector can facilitate the flow of electrons between the electrode and an exterior circuit.

In some embodiments, when the positive electrode or negative electrode uses a high loading level, the density of the electrode can be reduced to provide good cycling stability of the electrode. The density of the electrodes is a function, within reasonable ranges, of the press pressures. Generally, the density of the electrodes cannot be arbitrarily increased without sacrificing performance with respect to loading levels while achieving desired cycling performance and capacity at higher discharge rates. The characterization of the specific negative electrode layers and positive electrode layers are presented in the following sections.

In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm² (kilograms per square centimeter). The current collector used in the positive electrode can have a thickness from about 5 microns to about 30 microns, in other embodiments from about 10 microns to about 25 microns, and in further embodiments from about 14 microns to about 20 microns. In one embodiment, the positive electrode uses an aluminum foil current collector. The current collector used in the negative electrode can have a thickness from about 2 microns to about 20 microns, in other embodiments from about 4 microns to about 14 microns, and in further embodiments from about 6 microns to about 10 microns. In one embodiment, the negative electrode uses copper foil as current collector. A person of ordinary skill in the art will recognize that additional ranges of current collector thicknesses within the explicit ranges above are contemplated and are within the present disclosure.

Negative Electrodes

The basic electrode design comprises a blend of active compositions, polymer binder, and an electrically conductive diluent. As noted above, in some embodiments, improved electrode designs can involve a polymer binder blend and a blend of active compositions as well as nanoscale conductive carbon additives. The active material blend can comprise in some embodiments a majority of silicon based active material, such as a silicon oxide composite, and at least 10 weight percent of distinct graphite. Also, it has been discovered that stabilization of the electrode cycling with silicon based active materials can obtained with a blend of polyimide to provide high mechanical strength with a portion of a more deformable polymer that still provides good electrode performance in a synergistic binder blend. While the graphite can provide electrical conductivity to the electrode, it has also been found that in some embodiments a quantity of distinct nanoscale conductive carbon nevertheless can be significant toward the ability to produce a long cycling negative electrode. In general the nanoscale conductive carbon is not believed to be electrochemically active while the graphite is electrochemically active. These improved design aspects are then incorporated into electrodes with further previously discovered silicon based electrode improvements.

Significant interest has been directed to high capacity negative electrode active material based on silicon. Silicon based active materials generally have not achieved suitable cycling stability for automotive use for batteries containing significant quantities of silicon. The '535 application has demonstrated successful cycling suitable for consumer electronics applications and the like with cycling up to around 200-300 cycles at values of at least 80% initial capacity. Applicant has had particular success with respect to cycling stability has been achieved using materials primarily based on silicon oxide composites. Herein, electrodes are provided that can be successfully cycled for more than 600 cycles without a drop in capacity below 80% with cycling over a large voltage range at a reasonable rate. Thus, the present work is directed to extending cycling stability into a realm suitable for automotive use.

As described herein, improved cycling results are obtained with a blended active composition with a silicon based active material and graphitic carbon. Generally, an overall capacity of the negative electrode blended active material can be at least about 750 mAh/g, in further embodiments at least about 900 mAh/g, in additional embodiments at least about 1000 mAh/g, and in other embodiments at least about 1100 mAh/g cycled against lithium metal from 5 millivolts (mV) to 1.5V at a rate of C/3. The blended active material can comprise at least about 40 wt % silicon based active material, in further embodiments at least about 50 wt % silicon based active material, in other embodiments from about 55 wt % to about 95 wt % silicon based active material, and in additional embodiments from about 60 wt % to about 90 wt % silicon based active material. Correspondingly, the blended active material can comprise from about 5 wt % graphite to about 65 wt % graphite, in further embodiments from about 7 wt % graphite to about 60 wt % graphite, in additional embodiments from about 8 wt % graphite to about 55 wt %, and in other embodiments from about 10 wt % graphite to about 50 wt % graphite. A person of ordinary skill in the art will recognize that additional ranges of specific discharge capacity and concentrations of silicon based active material within the explicit ranges above are contemplated and are within the present disclosure.

As noted above and described in detail below, suitable silicon based active materials can comprise a composite with a carbon component. Silicon based active materials are discussed in detail in the following section. A composite refers to a particulate material with components that are intimately combined into an integral material with effective uniformity over appropriate scales, in contrast with blends that involve mixtures held together with a polymer binder. Composite components that can comprise, for example, silicon, oxygen, carbon and the like. While not wanting to be limited by theory, it is not generally believed that a carbon component of a composite with silicon is active in electrochemistry and generally not graphitic, although the activity is an abstract concept given the intimate combination in the composite and the crystal structure may be extremely complex and difficult to evaluate. In any case, the carbon component of a composite material is readily understood by a person of ordinary skill in the art to be distinguishable from the distinct graphite not in a composite in active material blends. The examples below are based on a commercial composite composition believed to be comprising primarily of silicon suboxide with some amounts of elemental silicon crystals and elemental carbon in a combined composite particulate material.

Graphite is available commercially in natural and synthetic forms, and suitable graphite includes either natural or synthetic graphite or the like. Graphite is a crystalline form of carbon with covalently bonded carbon in sheets. As used herein, graphite refers to graphitic carbon without requiring perfect crystallinity, and some natural graphite materials can have some crystalline impurities. But the graphite refers generally to a material dominated by a graphitic structure, as would be recognized in the art. Graphite is electrically conductive along the plane of the covalent carbon sheets that are stacked in the crystal. The crystalline carbon in graphitic forms can intercalate lithium, so that it is an established electrochemically active material for lithium ion batteries.

Graphite particles can have average particle diameters from about 1 micron to about 30 microns, in further embodiments from about 1.5 microns to about 25 microns, and in other embodiments from about 2 microns to about 20 microns. In general, it is desirable for the graphite to not include particles greater than the electrode thickness to avoid a bumpy electrode surface, and graphitic particles with a size significantly less than a micron can be less crystalline. In some embodiments, the graphitic carbon can have a D50 (mass median diameter) from about 5 microns to about 50 microns, in further embodiments from about 7 microns to about 45 microns and in additional embodiments from about 10 microns to about 8 microns to about 40 microns. Also, in some embodiments the BET surface area of graphitic carbon active material (which can be evaluated according to ISO 4652) can be from about 1 $m^2/g$ to about 100 $m^2/g$, in further embodiments from about 5 $m^2/g$ to about 85 $m^2/g$ and in additional embodiments from about 7.5 $m^2/g$ to about 60 $m^2/g$. A person of ordinary skill in the art will recognize that additional ranges of particle size and surface area for graphitic carbon active materials are contemplated and are within the present disclosure. In comparison, electrically conductive carbon blacks or the like (which have been referred to as paracrystalline) generally have surface areas of at least roughly 40 $m^2/g$ to 1000 $m^2/g$ or greater.

With respect to the polymer binder, Applicant has obtained reasonable cycling of silicon based cells using high tensile strength binders, e.g., polyimide binder. See U.S. Pat. No. 9,601,228 to Deng et al. (hereinafter the '228 patent) entitled: "Silicon Oxide Based High Capacity Anode Materials for Lithium Ion Batteries," incorporated herein by reference. In some embodiments to obtain longer cycling stability, it has been surprisingly found that a polymer binder blend further stabilizes cycling. In particular, a second polymer or combination of polymers providing a lower elastic modulus (corresponding with greater elasticity) can be blended with high tensile strength polyimide. The binder blend generally comprises at least about 50 wt % polyimide, in further embodiments at least about 55 wt % and in other embodiments from about 60 wt % to about 95 wt % polyimide. Similarly, the binder blend generally comprises at least about 5 wt % polymer with a lower elastic modulus, in further embodiments at least about 10 wt %, and in other embodiments from about 12 wt % to about 40 wt % lower elastic modulus polymer, as specified further below. A person of ordinary skill in the art will recognize that additional ranges of polymer quantities within the explicit ranges above are contemplated and are within the present disclosure. The polymers of the blend can be selected to be soluble in the same solvents.

Polyimides are polymers based on repeat units of the imide monomer structure. The polyimide polymer chain can be aliphatic, but for high tensile strength applications, the polymer backbone generally is aromatic with the polymer backbone extending along the N-atom of the polyimide structure. For silicon-based anodes that exhibit significant morphological changes during cycling, thermally curable polyimide polymers have been found desirable for high capacity negative electrodes, which may be due to their high mechanical strength. The following table provides suppliers of high tensile strength polyimide polymers, and names of corresponding polyimide polymers.

| Supplier | Binder |
|---|---|
| New Japan Chemical Co., Ltd. | Rikacoat PN-20; Rikacoat EN-20; Rikacoat SN-20 |
| DuPont | Kapton ® |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax ® HR16NN |

The polyimide polymers can have a tensile strength of at least about 60 MPa, in further embodiments at least about 100 MPa and in other embodiments at least about 125 MPa. Some commercial polyimides with high tensile strength can also have relatively high elongation values, which is the amount of elongation tolerated before the polymer tears. In some embodiments, the polyimides can have an elongation of at least about 40%, in further embodiments at least about 50% and in other embodiments at least about 55%. Tensile strengths and elongation values can be measured according to procedures in ASTM D638-10 Standard Test Method for Tensile Properties of Plastics or ASTM D882-91 Standard Test Method for Tensile Properties of Thin Plastic Sheeting, both of which are incorporated herein by reference. Based on values reported by commercial suppliers, the results from these alternative ASTM protocols seem similar to each other for polyimides. A person of ordinary skill in the art will recognize that additional ranges of polymer properties within the explicit ranges above are contemplated and are within the present disclosure.

Suitable more flexible polymer components can be selected to be inert with respect to the electrochemistry of the cell and to be compatible with processing with the polyimide. In particular, suitable more flexible polymer components include, for example, polyvinylidene fluoride (PVdF), carboxy methyl cellulose (CMC), styrene-butadiene rubber (SBR), lithiated polyacrylic acid (LiPAA), or mixtures thereof. With respect to polymer properties, some significant properties for high capacity negative electrode application are summarized in the following table.

| Binder | Elongation | Tensile Strength (MPa) | Elastic Modulus (GPa) |
|---|---|---|---|
| PVDF | 5-50% | 30-45 | 1.0-2.5 |
| Polyimide | 30-100% | 60-300 | 2.5-7 |
| CMC | 30-40% | 10-15 | 1-5 |
| SBR | 400-600% | 1-25 | 0.01-0.1 |
| LiPAA | 1-6% | 90 | 1-4 |

PVDF refers to polyvinylidene fluoride, CMC refers to sodium carboxy methyl cellulose, SBR refers to styrene-butadiene rubber, and LiPAA refers to lithiated polyacrylic acid. PVDF, CMC, 10 and SBR are available commercially from many sources. LiPAA can be made from LiGH and commercial polyacrylic acid (PAA). For example, a stoichiometric amount of LiGH can be added to a solution of PAA with one mole of LiGH per monomer unit of PAA. The formation and use of LiPAA is described further in Li et al., "Lithium polyacrylate as a binder for tin-cobalt-carbon negative electrodes in lithium-ion batteries," Electrochemica Acta 55 (2010)2991-2995, incorporated herein by reference.

The elongation refers to the percent elongation prior to tearing of the polymer. In general, to accommodate the silicon based materials, it is desirable to have an elongation of at least about 30%, in some embodiments at least about 50%, and in further embodiments at least about 70%. For the polymer binder blend, it can be desirable for the more elastic polymer binder component to have an elastic modulus (alternatively referred to as Young's modulus or tensile modulus) of no more than about 2.4 GPa, in further embodiments no more than about 2.25 GPa, in other embodiments no more than about 2 GPa, and in additional embodiments no more than about 1.8 GPa. A person of ordinary skill in the art will recognize that additional ranges of more elastic polymer component properties within the explicit ranges above are contemplated and are within the present disclosure.

To form the electrode, the powders can be blended with the polymer in a suitable liquid, such as a solvent for dissolving the polymer. Polyimides and PVdF can generally be processed in N-methyl pyrrolidone (NMP), although other suitable organic solvents may be used. Water processable polyimides are commercially available, and these water processable polyimides are suitable for blending with a wider range of other polymers. The particulate components of the electrode, i.e., the active material and nanoscale conductive carbon, can be blended with the polymer binder blend in the solvent to form a paste. The resulting paste can be pressed into the electrode structure.

The active material loading in the binder can be large. In some embodiments, the negative electrode has from about 75 to about 92 wt % of negative electrode active material, in other embodiments from about 77 to about 90 wt % of the negative electrode active material, and in further embodiments from about 78 to about 88 wt % of the negative electrode active material. In some embodiments, the negative electrode has from about 6 to about 20 wt % polymeric binder, in other embodiments about 7 to 19 wt % polymeric binder, and in further embodiments from about 8 to 18 wt % polymeric binder. Also, in some embodiments, the negative electrode comprises from about 1 to about 7 wt % nanoscale conductive carbon, in further embodiments form about 1.5 to about 6.5 wt %, and in additional embodiments from about 2 to about 6 wt % nanoscale conductive carbon. A person of ordinary skill in the art will recognize that additional ranges of polymer loadings within the explicit ranges above are contemplated and are within the present disclosure.

For improved cycling negative electrodes, nanoscale carbon additives or combinations thereof have been found to be particularly desirable. Nanoscale conductive carbon refers generally to particles of high surface area elemental carbon having at least two dimensions of the primary particles being submicron. Suitable nanoscale conductive carbon includes, for example, carbon black, carbon nanotubes and carbon nanofibers. In some embodiments, the nanoscale conductive carbon additive used in the negative electrode can comprise carbon nanotubes, carbon nanofibers, carbon nanoparticles (e.g., carbon black), or combinations thereof. In some embodiments, to achieve improved performance a conductive additive can have a conductivity of at least about 40 S/cm, in some embodiments at least about 50 S/cm, and in further embodiments at least about 60 S/cm. A person of ordinary skill in the art will recognize that additional ranges of particles loadings and conductivities within the explicit ranges about are contemplated and are within the present disclosure.

Electrical conductivity, which is the inverse of resistivity, can be reported by distributors, and the conductivity is generally measured using specific techniques developed by the distributors. For example, measurements of carbon black electrical resistance is performed between two copper electrodes with Super P™ carbon blacks, see Imerys Graphite & Carbon, A Synopsis of Analytical Procedures, 2019 (http://www.imerys-graphite-and-carbon.com/wordpress/wp-app/uploads/2019/02/Analytical-Procedures_Web_21Feb19.pdf). Suitable supplemental electrically conductive additives can also be added to contribute to longer term cycling stability. Alternatively, some suppliers describe the conductive carbon concentrations to achieve the conductive percolation threshold.

Carbon black refers to synthetic carbon materials and can alternative be referred to as acetylene black, furnace black, thermal black or other names suggesting the synthesis approach. Carbon black generally is referred to as amorphous carbon, but there are suggestions of small domains with short or medium range order corresponding to graphite or diamond crystal structure in at least some forms of carbon black, but for practical purposes the material can be considered amorphous. Under ISO Technical Specification 80004-1 (2010) carbon black is a nanostructured material. The primary particles of carbon black can be on the order of tens of nanometers or less, but the primary particles are generally hard fused into chains or other aggregates, and the smallest dispersible units can be considered between about 80 nm and 800 nm, which is still submicron. Carbon blacks are available commercially that have been synthesized to provide a desirable level of electrical conductivity, such as Super-P® (Imerys), Ketjenblack® (Akzo Nobel), Shawinigan Black® (Chevron-Phillips), and Black Pearls 2000® (Cabot).

Carbon nanofibers are high aspect ratio fibers that generally comprise graphene layers in plates, cones or other forms, which carbon nanotubes comprise graphene sheets folded into tubes. Carbon nanofibers can have diameters of 250 nm or less and are commercially available, for example, Pyrograf® carbon nanofibers (Pyrograf Products, Inc.) or from American Elements, Inc. Carbon nanotubes have been found to be a desirable conductive additive that can improve cycling performance for either a positive electrode or a negative electrode. Single wall or multiwall carbon nanotubes are also available from American Elements, Inc. (CA, USA), Cnano Technologies (China), Fuji, Inc. (Japan), Alfa Aesar (MA, USA) or NanoLabs (MA, USA).

The negative electrode used in the cells described herein can have high active material loading levels along with reasonably high electrode density. For a particular active material loading level, the density is inversely correlated with thickness so that an electrode with a greater density is thinner than an electrode with a lower density. Loading is equal to the density times the thickness. In some embodiments, the negative electrode of the battery has a loading level of negative electrode active material that is at least about 1.5 mg/cm$^2$, in other embodiments from about 2 mg/cm$^2$ to about 8 mg/cm$^2$, in additional embodiments from about 2.5 mg/cm$^2$ to about 6 mg/cm$^2$, and in other embodiments from about 3 mg/cm$^2$ to about 4.5 mg/cm$^2$. In some embodiments, the negative electrode of the battery has an active material density in some embodiment from about 0.5 g/cc (cc=cubic centimeters (cm$^3$)) to about 2 g/cc, in other embodiment from about 0.6 g/cc to about 1.5 g/cc, and in additional embodiments from about 0.7 g/cc to about 1.3 g/cc. Similarly, the silicon oxide based electrodes can have an average dried thickness of at least about 15 microns, in further embodiments at least about 20 microns and in additional embodiments from about 25 microns to about 75 microns. The resulting silicon oxide based electrodes can exhibit capacities per unit area of at least about 3.5 mAh/cm$^2$, in further embodiments at least about 4.5 mAh/cm$^2$ and in additional embodiments at least about 6 mAh/cm$^2$. A person of ordinary skill in the art will recognize that additional ranges of active material loading level and electrode densities within the explicit ranges above are contemplated and are within the present disclosure.

High Capacity Silicon Based Anode Materials

In general, the battery designs herein are based on a high capacity anode active material. Specifically, the anode active materials generally have a specific capacity of at least about 800 mAh/g, in further embodiments at least about 900 mAh/g, in additional embodiments at least about 1000 mAh/g, in some embodiments at least about 1150 mAh/g and in other embodiments at least about 1400 mAh/g when cycled at a rate of C/10 against lithium metal from 0.005V to 1.5V. As this implies, the specific capacity of negative electrode active material can be evaluated in a cell with a lithium metal counter electrode. However, in the batteries described herein, the negative electrodes can exhibit reasonably comparable specific capacities when cycled against high capacity lithium metal oxide positive electrode active materials. In the battery with non-lithium metal electrodes, the specific capacity of the respective electrodes can be evaluated by dividing the battery capacity by the respective weights of the active materials. As described herein, desirable cycling results can be obtained with a combination of a silicon based active material and a graphitic carbon active material with good capacities observed.

Elemental silicon, silicon alloys, silicon composites and the like can have a low potential relative to lithium metal similar to graphite. However, elemental silicon generally undergoes a very large volume change upon alloying with lithium. A large volume expansion on the order of two to four times of the original volume or greater has been observed, and the large volume changes have been correlated with a significant decrease in the cycling stability of batteries having silicon-based negative electrodes.

Commercially available composites of silicon suboxide, elemental silicon and carbon can be used in the cells described herein. Also, other formulations of silicon based negative electrode active materials have been developed with high capacity and reasonable cycling properties. Some silicon based compositions are described below that provide potential and promising alternatives to commercially available SiO based compositions. The improved electrolyte formulations described herein are found to be particularly effective with silicon based negative electrode active materials as well as with blends of silicon based active materials with graphite.

Also, silicon based high capacity materials in a negative electrode of a lithium-based battery can exhibit in some formulations a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode, i.e., negative electrode, can result in a low energy battery. In order to compensate for the large anode IRCL, supplemental lithium can be added directly or indirectly to the negative electrode material to offset the IRCL. The use of supplemental lithium to improve the performance of silicon based electrodes is described also in the '694 patent and '228 patent, both cited above and incorporated herein by reference. The use of supplemental lithium in the improved battery designs is described further below.

The anode, i.e., negative electrode, of the batteries described herein can use nanostructured active silicon based materials to accommodate better for volume expansion and thus maintain the mechanical electrode stability and cycle life of the battery. Nanostructured silicon based negative electrode compositions are disclosed in the '694 application, the '228 patent, as well as U.S. Pat. No. 9,139,441 to Anguchamy et al. (the '441 patent), entitled: "Porous Silicon Based Anode Material Formed Using Metal Reduction," incorporated herein by reference. Suitable nanostructured silicon can include, for example, nanoporous silicon and nanoparticulate silicon. Also, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. Furthermore, pyrolytic carbon coatings are also observed to stabilize silicon-based materials with respect to battery performance.

Desirable high capacity negative electrode active materials can comprise porous silicon (pSi) based materials and/or composites of the porous silicon based materials. In general, the pSi based material comprises highly porous crystalline silicon that can provide high surface areas and/or high void volume relative to bulk silicon. While nanostructured porous silicon can be formed through a variety of approaches such as electrochemical etching of a silicon wafer, particularly good battery performance has been obtained from nanostructured porous silicon obtained by metal reduction of silicon oxide powders. In particular, the material has particularly good cycling properties while maintaining a high specific capacity. The formation of composites of pSi based material with carbon based material or metal can additionally mechanically stabilize the negative electrode for improved cycling. Additional description of the pSi based material from the reduction of silicon oxide can be found in the '441 patent referenced above.

With respect to the composite materials, nanostructured silicon components can be combined with, for example, carbon nanoparticles and/or carbon nanofibers within an intimate composite material. The components can be, for example, milled to form the composite, in which the materials are intimately associated. Generally, it is believed that the association has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Also, carbon coatings can be applied over the silicon-based materials to improve electrical conductivity, and the carbon coatings seem to also stabilize the silicon based material with respect to improving cycling and decreasing irreversible capacity loss. Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture with the silicon based material coated with the carbon precursor can be heated in an oxygen free atmosphere to pyrolyze the organic composition, such as organic polymers, some lower molecular solid organic compositions and the like, and to form a carbon coating.

As with silicon, oxygen deficient silicon oxide, e.g., silicon oxide, $SiO_x$, $0.1 \leq x \leq 1.9$, can intercalate/alloy with lithium such that the oxygen deficient silicon oxide can perform as an active material in a lithium ion battery. These oxygen deficient silicon oxide materials are generally referred to as silicon oxide based materials and in some embodiments can contain various amounts of silicon, silicon oxide, and silicon dioxide. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon.

Silicon oxide based compositions have been formed into composite materials with high capacities and very good cycling properties as described in the '228 patent referenced above. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials.

In general, a range of composites can be used and can comprise silicon oxide, carbon components, such as graphitic particles (Gr), inert metal powders (M), elemental silicon (Si), especially nanoparticles, pyrolytic carbon coatings (HC), carbon nano fibers (CNF), or combinations thereof. The component structure may or may not correspond with the structure of the components within the composite material. Thus, the general compositions of the composites can be represented as $\alpha SiO-\beta Gr-\chi HC-\delta M-\varepsilon CNF-\phi Si$, where $\alpha$, $\beta$, $\chi$, $\delta$, $\varepsilon$, and $\phi$ are relative weights that can be selected such that $\alpha+\beta+\chi+\delta+\varepsilon+\phi=1$. Generally $0.35<\alpha<1$, $0\leq\beta<0.6$, $0\leq\chi<0.65$, $0\leq\delta<0.65$, $0\leq\varepsilon<0.65$, and $0\leq\phi<0.65$. Certain subsets of these composite ranges are of particular interest. In some embodiments, composites with SiO and one or more carbon based components are desirable, which can be represented by a formula $\alpha SiO-\beta Gr-\chi HC-\varepsilon CNF$, where $0.35<\alpha<0.9$, $0\leq\beta<0.6$, $0\leq\chi<0.65$ and $0\leq\varepsilon<0.65$ ($\delta=0$ and $\phi=0$), in further embodiments $0.35<\alpha<0.8$, $0.1\leq\beta<0.6$, $0.0\leq\chi<0.55$ and $0\leq\varepsilon<0.55$, in some embodiments $0.35<\alpha<0.8$, $0\leq\beta<0.45$, $0.0\leq\chi<0.55$ and $0.1\leq\varepsilon<0.65$, and in additional embodiments $0.35<\alpha<0.8$, $0\leq\beta<0.55$, $0.1\leq\chi<0.65$ and $0\leq\varepsilon<0.55$. In additional or alternative embodiments, composites with SiO, inert metal powders and optionally one or more conductive carbon components can be formed that can be represented by the formula $\alpha SiO-\beta Gr-\chi HC-\delta M-\varepsilon CNF$, where $0.35<\alpha<1$, $0\leq\beta<0.55$, $0\leq\chi<0.55$, $0.1\leq\delta<0.65$, and $0\leq\varepsilon<0.55$. In further additional or alternative embodiments, composites of SiO with elemental silicon and optionally one or more conductive carbon components can be formed that can be represented by the formula $\alpha SiO-\beta Gr-\chi HC-\varepsilon CNF-\phi Si$, where $0.35<\alpha<1$, $0\leq\beta<0.55$, $0\leq\chi<0.55$, $0\leq\varepsilon<0.55$, and $0.1\leq\phi<0.65$ and in further embodiments $0.35<\alpha<1$, $0\leq\beta<0.45$, $0.1\leq\chi<0.55$, $0\leq\varepsilon<0.45$, and $0.1\leq\phi<0.55$. A person of ordinary skill in the art will recognize that additional ranges within the explicit ranges above are contemplated and are within the present disclosure. As used herein, the reference to composites implies application of significant combining forces, such as from HEMM milling, to intimately associate the materials, in contrast with simple blending, which is not considered to form composites.

Solution based approaches for the synthesis of various Si—$SiO_x$-C-M (M=metal) composites are described in published U.S. patent application 2014/0308585 to Han et al., entitled "Silicon-Based Active Materials for Lithium Ion Batteries and Synthesis With Solution Processing," incorporated herein by reference. Silicon-based carbon composites with graphene sheets are described in published U.S. patent application 2014/0370387 to Anguchamy et al., entitled "Silicon-Silicon Oxide-Carbon Composites For Lithium Battery Electrodes and Methods for Forming the Composites," incorporated herein by reference. Commercial materials that are believed to comprise a $SiO_x$—Si—C or $SiO_x$-Si composite are used in the batteries in the Examples.

The capacity of the anode significantly influences the energy density of the battery. A higher specific capacity of the anode material results in a lower weight of the anode in the cell for the same output. When the negative electrode is made from a silicon based material, the electrode can have a discharge specific capacity at a rate of C/3 from about 800 mAh/g to 2500 mAh/g, in further embodiments from about 900 mAh/g to about 2300 mAh/g and in other embodiments from about 950 mAh/g to about 2200 mAh/g at C/3 discharge from 1.5V to 5 mV against lithium metal. A person of ordinary skill in the art will recognize that additional ranges of discharge specific capacity within the explicit ranges above are contemplated and are within the present disclosure.

Positive Electrodes

Various positive electrode chemistries can be introduced effectively with the improved negative electrodes described above. The selected compositions can be blended into positive electrode along with a suitable binder and electrically conductive materials. This section focuses on particularly desirable positive electrode active materials for high voltage cycling and moderately high capacity. Also, this section describes the overall electrode composition and properties.

To some degree, the desired application of the final cells can influence the selection of the positive electrode composition. From this perspective, a broad range of compositions are described in the following. For automotive use and for similar applications, a particular positive electrode chemistry has found to be desirable with respect to achieving high energy density along with cycling to over 600 cycles while maintaining at least 80% capacity, although some materials provide promising results with somewhat lesser cycling stability. Specifically, nickel-rich lithium nickel manganese cobalt oxides are found to provide the very long cycling performance herein based on the improved electrolytes described herein. In alternative embodiments, a blend of nickel-rich lithium nickel manganese cobalt oxide and (lithium+manganese) rich-lithium nickel manganese cobalt oxide are blended to provide reasonable positive electrode performance. Furthermore, the nickel rich lithium nickel manganese cobalt oxides alone as the active material can provide desirably high energy densities due to the average discharge voltage with good cycling when paired with the silicon based negative electrodes described herein. Examples are presented below for a nickel rich lithium nickel manganese cobalt oxides alone.

Nickel-rich lithium nickel manganese cobalt oxides (N-NMC) can provide desirable cycling and capacity properties for the lithium ion batteries described herein. In particular, the nickel-rich compositions can be approximately represented by the formula $LiNi_xMn_yCo_zO_2$, $x+y+z\approx1$, $0.45\le x$, $0.025\le y$, $z\le0.35$, in further embodiments, $0.50\le x$, $0.03\le y$, $z\le0.325$, and in $0.55\le x$, $0.04\le y$, $z\le0.3$. The amount of nickel can influence the selected charge voltage to balance cycling stability and discharge energy density. For values of x in the range of $0.525\le x\le0.7$ a selected charge voltage can be from 4.25V to 4.375V. For values of x in the range of $0.7\le x\le0.9$, the selected charge voltage can be from 4.05V to 4.325V. A person of ordinary skill in the art will recognize that additional ranges of composition and selected charge voltages within the explicit ranges above are contemplated and are within the present disclosure. These composition have been found to provide relatively stable higher voltage cycling, good capacities and desirable impedance. N-NMC powders can be synthesized using techniques, such as coprecipitation described further below, and these are available commercially, such as from BASF (Germany), TODA (Japan), L&F Materials Corp. (Korea), Umicore (Belgium), and Jinhe Materials Corp. (China).

For the N-NMC compositions, the average voltage trends slightly larger with increasing amounts of nickel, but the charge voltage for stable cycling trends slightly lower with increasing nickel. Thus, there can be tradeoffs with active material selection, although the N-NMC active materials can provide good cycling and reasonably high capacity and energy density.

As noted above, desirable blends can comprise N-NMC with (lithium rich+manganese rich) lithium nickel manganese cobalt oxides (LM-NMC or HCMR®). These compositions can be approximately represented by the formula $Li_{1+b}Ni_\alpha Mn_\beta Co_\gamma A_\delta O_{2-z}F_z$, where $b+\alpha+\beta+\gamma+\delta\approx1$, b ranges from about 0.04 to about 0.3, α ranges from 0 to about 0.4, β range from about 0.2 to about 0.65, γ ranges from 0 to about 0.46, δ ranges from about 0 to about 0.15 and z ranges from 0 to 0.2, with the proviso that both α and γ are not 0, and where A is a metal different from lithium, manganese, nickel and cobalt. In some embodiments, A can be Mg, Sr, Ba, Cd, Zn, Al, Ga, B, Zr, Ti, Ca, Ce, Y, Nb, Cr, Fe, V, or combinations thereof. Also, in additional or alternative embodiments, $Li_{1+b}Ni_\alpha Mn_\beta Co_\gamma A_\delta O_2$ with $0.05\le b\le0.125$, $0.225\le\alpha\le0.35$, $0.35\le\beta\le0.45$, $0.15\le\gamma\le0.3$, $0\le\delta\le0.05$ and up to five mole percent of the oxygen can be replaced with a fluorine dopant. A person of ordinary skill in the art will recognize that additional ranges of composition within the explicit ranges above are contemplated and are within the present disclosure. Long cycle stability has been achieved for (lithium+manganese) rich-NMC active materials at relatively high cycling voltages, as described in U.S. Pat. No. 8,928,286 to Amiruddin et al., entitled "Very Long Cycling of Lithium Batteries With Lithium Rich Cathode Materials," incorporated herein by reference.

The LM-NMC positive electrode material can be advantageously synthesized by co-precipitation and sol-gel processes detailed in the '160 patent and the '873 patent. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '873 patent gave desired lithium rich metal oxide materials having cobalt in the composition and exhibiting the high specific capacity performance with superior tap density. These patents also describe the effective use of metal fluoride coatings to improve performance and cycling.

It is found that for LM-NMC positive electrode active materials a coating on the material can improve the performance of corresponding cells. Suitable coating materials, which are generally believed to be electrochemically inert during battery cycling, can comprise metal fluorides, metal oxides, or metal non-fluoride halides. The results in the Examples below relating to LM-NMC are obtained with LM-NMC materials coated with metal fluorides. Improved metal fluoride coatings with appropriately engineered thicknesses are described in U.S. Pat. No. 9,843,041 to Lopez et al, entitled "Coated Positive Electrode Materials for Lithium Ion Batteries," incorporated herein by reference. Suitable metal oxide coatings are described further, for example, in U.S. Pat. No. 8,535,832B2 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in U.S. Pat. No. 8,663,849B2 to Venkatachalam et al., entitled "Metal Halide Coatings on Lithium Ion Battery Positive Electrode Materials and Corresponding Batteries," incorporated herein by reference.

With respect to the active material blends for a positive electrode, the active materials can comprise from about 3 weight percent to about 85 weight percent LM-NMC, in further embodiments from about 5 weight percent to about 75 weight percent LM-NMC, in additional embodiments from about 6 weight percent to about 70 weight percent LM-NMC, and in other embodiments from about 7 weight percent to about 65 weight percent LM-NMC. Similarly, in the positive electrode active material blends, the active materials can comprise from about 15 weight percent to about 97 weight percent N-NMC, in further embodiments, from about 25 weight percent to about 95 weight percent, in additional embodiments from about 30 weight percent to about 94 weight percent, and in other embodiments from about 35 weight percent to about 93 weight percent N-NMC. The positive electrode active materials can optionally comprise from 0 to 25 weight percent additional active materials, such as lithium cobalt oxide, $LiNi_{0.33}Mn_{0.33}Co_{0.33}O_2$ (NMC111), $LiNi_{0.8}Co_{0.15}Al_{0.05}O_2$ (NCA), mixtures thereof, or the like. A person of ordinary skill in the art will recognize that additional ranges of composition blends within the explicit ranges above are contemplated and are within the present disclosure.

As noted above, the positive electrode generally comprises active material, with an electrically conductive material within a binder. The active material loading in the electrode can be large. In some embodiments, the positive electrode comprises from about 85 to about 99% of positive electrode active material, in other embodiments from about 90 to about 98% of the positive electrode active material, and in further embodiments from about 95 to about 97.5% of the positive electrode active material. In some embodiments, the positive electrode has from about 0.75 to about 10% polymeric binder, in other embodiments from about 0.8 to about 7.5% polymeric binder, and in further embodiments from about 0.9 to about 5% polymeric binder. The positive electrode composition generally can also comprise an electrically conductive additive distinct from the electroactive composition. In some embodiments, the positive electrode can have 0.4 weight percent to about 12 weight percent conductive additive, in further embodiments from about 0.45 weight percent to about 7 weight percent, and in other embodiments from about 0.5 weight percent to about 5 weight percent conductive additive. A person of ordinary skill in the art will recognize that additional ranges of particles loadings within the explicit ranges about are contemplated and are within the present disclosure. The positive electrode active materials are described above. Suitable polymer binders for the positive electrode include, for example, polyvinylidine fluoride, polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. For the positive electrode, polyvinylidiene fluoride (pvdf) can be used with good results, and the positive electrodes in the examples use a pvdf binder. Electrically conductive additives are described in detail for the negative electrode, and nanoscale conductive carbon can be used effectively for the positive electrode.

For a particular loading level, the electrode density (of active material) is inversely correlated with thickness so that an electrode with a greater density is thinner than an electrode with a lower density. Loading is equal to the density times the thickness. In some embodiments, the positive electrode of the battery has a loading level of positive electrode active material that is from about 10 to about 40 $mg/cm^2$, in other embodiments from about 12 to about 37.5 $mg/cm^2$, in additional embodiments from about 13 to about 35 $mg/cm^2$, and in other embodiments from 20 to about 32.5 $mg/cm^2$ In some embodiments, the positive electrode of the battery has an active material density in some embodiment from about 2.5 g/cc to about 4.6 g/cc, in other embodiment from about 3.0 g/cc to 4.4 g/cc, and in additional embodiment from about 3.25 g/cc to about 4.3 g/cc. In further embodiments, the positive electrodes can have a thickness on each side of the current collector following compression and drying of the positive electrode material from about 45 microns to about 300 microns, in some embodiments from about 80 microns to about 275 microns and in additional embodiments from about 90 microns to about 250 microns. A person of ordinary skill in the art will recognize that additional ranges of active material loading level, electrode thickness and electrode densities within the explicit ranges above are contemplated and are within the present disclosure.

Supplemental Lithium

The improved high energy battery designs described herein generally comprise supplemental lithium, and this section is directed to approaches for the incorporation of supplemental lithium for appropriate embodiments. In general, the inclusion of supplemental lithium is desirable for cells with silicon-based negative electrode active materials since the material exhibit relatively high irreversible capacity loss during the initial charge of the battery. Also, supplemental lithium surprisingly also stabilizes cycling of LM-NMC. Various approaches can be used for the introduction of supplemental lithium into the battery, although following corresponding initial reactions and/or charging, the negative electrode becomes associated with excess lithium for cycling from the supplemental lithium. With respect to the negative electrode in batteries having supplemental lithium, the structure and/or composition of the negative electrode can change relative to its initial structure and composition following the first cycle as well as following additional cycling.

Depending on the approach for the introduction of the supplemental lithium, the positive electrode may initially comprise a source of supplemental lithium and/or a sacrificial electrode can be introduced comprising supplemental lithium. Additionally or alternatively, supplemental lithium can be associated with the negative electrode. In some embodiments, the supplemental lithium can be introduced into the negative electrode using electrochemical methods in contrast with purely chemical or mechanical methods. If the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source in addition to other electrode components.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium can drive the reaction as long as the circuit is closed. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage, which then also involves extraction of lithium (e.g., de-intercalation or de-alloying) from the positive electrode active material.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from Livent Corporation, are sold with proprietary coatings for stability. The coatings generally do not alter the performance of the lithium powders for electrochemical applications. After the negative electrode is in contact with electrolyte, a reaction can take place, and the supplemental lithium is transferred to the negative electrode active material. Since the electrode is electrically conductive internally, the circuit does not need to be closed to provide for electron flow resulting from the reactions. During this process, the solid electrolyte interface (SEI) layer may also be formed. Thus, the supplemental lithium is loaded into the negative electrode active material with at least a portion generally consumed in formation of the SEI layer. Supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material placed on the surface of the active layer. In an alternative configuration, a supplemental lithium source layer is between the active layer and current collector. Also, in some embodiments, the negative electrode can comprise supplemental lithium source layers on both surfaces of the active layer.

An arrangement to perform electrochemical preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, a lithium source within an electrode can be assembled into a cell with the electrode to be preloaded with lithium. A separator can be placed between the respective electrodes. Current can be allowed to flow between the electrodes to provide for controlled electrochemical prelithiation. Depending on the composition of the lithium source it may or may not be necessary to apply a voltage to drive the lithium deposition within the silicon-based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, such as lithium metal foil, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, an SEI layer can be formed with a desired degree of control during the preloading with lithium of the negative electrode active material. Then, the negative electrode is fully formed during the preparation of the negative electrode with a selected preloading with lithium.

In general, for embodiments in which supplemental lithium is used, the amount of supplemental lithium preloaded or available to load into the active composition can be in an amount of at least about 2.5% of capacity, in further embodiments from about 3 percent to about 55 percent of capacity, in additional embodiments from about 5 percent to about 52.5 percent of capacity, and in some embodiments from about 5 percent to about 50 percent of the negative electrode active material capacity. The supplemental lithium can be selected to approximately balance the IRCL of the negative electrode, although other amounts of supplemental lithium can be used as desired. In some embodiment, the supplemental lithium added is in an amount with an oxidation capacity corresponding to from 60% to 180% of the first cycle IRCL of the negative electrode, in further embodiments, it is from 80% to 165%, and in other embodiments from 90% to 155%. A person of ordinary skill in the art will recognize that additional ranges of percentage within the explicit ranges above are contemplated and are within the present disclosure. Thus, the contribution to the IRCL of the negative electrode can be effectively reduced or removed due to the addition of the supplemental lithium such that the measured IRCL of the battery represents partially or mostly contributions from the IRCL of the positive electrode, which is not diminished due to the presence of supplemental lithium. A person of ordinary skill in the art will recognize that additional ranges of IRCL within the explicit ranges above are contemplated and are within the present disclosure.

Balance of Cathode and Anode

The overall performance of the battery has been found to depend on the capacities of both the negative electrode and positive electrode and their relative balance. Balance of the electrodes has been found to be significant with respect to achieving a particularly high energy density for the battery as well as to achieve good cycling properties. In some embodiments, there may be a tradeoff with respect to achieving longer cycling stability and energy density. To achieve longer cycling stability, it can be desirable to balance the battery to achieve a relatively lower energy density, but with a battery suitable for stable long term use under a broader range of operating parameters. With appropriately selected active materials, desirable electrode designs and improved electrolyte formulations, high energy densities are still achievable while obtaining cycling to more than 800 cycles with no more than 80% capacity drop. The electrode balance can be evaluated in several alternative ways, which can work effectively when properly accounting for the particular evaluation approach.

Testing of active materials can be performed in lithium cells with a lithium metal electrode, and such cells are generally referred to as half-cells, in contrast with lithium ion cells with both electrodes comprising a lithium alloying or intercalation material (referred to as full cells). In a half cell with a silicon based electrode, the lithium electrode acts as the negative electrode, and the silicon based electrode acts as the positive electrode, which is opposite of its usual role as the negative electrode in a lithium ion cell.

The positive electrode active material capacity can be estimated from the capacity of the material which can be measured by cycling the material against lithium metal foil. For example, for a given positive electrode, the capacity can be evaluated by determining the insertion and extraction capacities during the first charge/discharge cycle, where the lithium is de-intercalated or extracted from the positive electrode to a voltage selected based on the material chemistry and the selected charge voltage of the cell design (generally from 4.2V to 4.5V) and intercalated or inserted back into the positive electrode to 2V at a rate of C/20, with a slight adjustment, e.g. generally 0.1V, to a higher charge voltage against the lithium metal based on the voltage of the ultimate anode relative to lithium metal. Similarly, for a given silicon based electrode, the insertion and extraction capacities can be evaluated with a battery having a positive electrode comprising the silicon based active material and a lithium foil negative electrode. The capacity is evaluated by determining the insertion and extraction capacities of the battery during the first charge/discharge cycle where lithium is intercalated/alloyed to the silicon based electrode to 5 mV and de-intercalated/de-alloyed to 1.5V at a rate of C/20. In actual use, the observed capacities can change from the tested capacities due to various factors, such as high rate operation and alteration of voltage range, which can be due to battery design as well as due to composition of the counter electrode not being lithium metal. For some evaluation approaches, a subsequent capacity after the first cycle can be used to evaluate electrode balance, and if desired a greater discharge rate can be used, such as C/3 or C/10. The use of the balance after a formation cycle or a few formation cycles can be desirable in that the balance is based more on conditions during use of the battery.

In most commercially available carbon based batteries, approximately 7-10% excess anode is taken over the cathode to prevent lithium plating. One important concern of too much excess anode is that the weight of the cell will increase reducing the energy density of the cell. Compared to graphite which has a first cycle IRCL of ~7%, high capacity silicon based anodes can have IRCL ranging from about 10% to about 40%. A significant portion of the capacity may become inactive in the cell after the first charge-discharge cycle and add to significant dead weight to the battery.

For high capacity anode materials, the negative electrode irreversible capacity loss generally is greater than the positive electrode irreversible capacity loss, which generates additional lithium availability for the cell. If the negative electrode has a significantly higher irreversible capacity loss than the positive electrode, the initial charge of the negative electrode irreversibly consumes lithium so that upon subsequent discharge, the negative electrode cannot supply enough lithium to provide the positive electrode with sufficient lithium to satisfy the full lithium accepting capacity of the positive electrode. This results in a waste of positive electrode capacity, which correspondingly adds weight that does not contribute to cycling. Most or all of the lithium loss from the net IRCL (negative electrode IRCL minus positive electrode IRCL) can be compensated by supplemental lithium as described above. Evaluation of electrode balance during the 1st formation cycle may or may not account for supplemental lithium. In subsequent cycles after the formation cycle or a few cycles, any excess supplemental lithium not consumed for the IRCL is generally alloyed into the anode material. The electrode balance can be evaluated at a cycling stage after formation, such as the 4th cycle at a selected rate, and these capacities can be estimated from the electrode performances.

From the perspective of providing stable longer term cycling performance, it can be desirable to balance the electrodes to provide for effective use of both electrode capacities as well as avoiding the plating of lithium metal during cycling. In general, the balance of the electrodes is considered at the time of assembly of the electrodes referencing the initial capacities of the electrodes relative to lithium metal.

In general, battery life can be selected to end when the energy output drops by roughly 20% from the initial capacity at a constant discharge rate, although other values can be selected as desired. For the materials described herein, the drop in capacity with cycling of the negative electrode is generally greater than for the positive electrode, so that the avoidance of lithium metal deposition with cycling suggests a greater excess capacity of the negative electrode to further stabilize cycling. Roughly, if the negative electrode capacity fades about twice as fast as the positive electrode capacity, it would be desirable to include at least 10% additional negative electrode capacity to account for cycling. In the robust battery design, at least about 10% additional negative electrode can be desired at various discharge conditions. In general, the balance can be selected such that the initial negative electrode charge capacity evaluated at a rate of C/20 from an open circuit voltage to 1.5V against lithium is about 110% to about 195%, in further embodiment from about 120% to about 185% and in additional embodiments from about 130% to about 190% relative to the sum of the initial positive electrode charge capacity at a rate of C/20 from an open circuit voltage to the charge voltage of the cell design (generally from 4.2V to 4.6V) plus the oxidation capacity of any supplemental lithium. Alternatively, the electrode balance can be evaluated at the fourth cycle at a discharge rate of C/10 or C/3 with the negative electrode capacity relative to positive electrode capacity from about 110% to about 195%, in further embodiment from about 120% to about 185% and in additional embodiments from about 130% to about 190%. A person of ordinary skill in the art will recognize that additional ranges of balance within the explicit ranges above are contemplated and are within the present disclosure. Such a balance is described in the battery designs described below.

Performance Properties

The improved electrolyte formulations described herein can further extend cycling improvements obtained with negative electrode designs particularly effective for silicon based materials. The combination of design features described herein can provide longer cycling stability while maintaining desirable battery performance. The achievement of the long term cycling involves use of the improved electrode designs described herein with the balance of cell design parameters in combination with the improved electrolyte formulation that surprisingly further extend the cycling with unprecedented stability.

The selected charge voltage can be influenced by the positive electrode active material. Generally, the selected charge voltage for these cells is from about 4.05V to 4.4V. The batteries can exhibit very good cycling performance. In some embodiments, the batteries can exhibit a discharge capacity at cycle 700 of at least about 80% of the 6th cycle capacity discharged at 1C rate from the selected charge voltage to 2.5V at 30° C., in other embodiments at least about 82% and in additional embodiments at least about 84% at the 700th cycle relative to the 6th cycle discharge capacity when cycled from the selected charge voltage to 2.5V at C at 30° C. Similarly, the batteries can exhibit a discharge capacity at cycle 725 of at least about 80% of the 6th cycle capacity discharged at 1C rate from the selected charge voltage to 2.5V at 30° C., in other embodiments at cycle 750 of at least about 80% and in additional embodiments at cycle 800 of at least about 80% relative to the 6th cycle discharge capacity when cycled from the selected charge voltage to 2.5V at C/3 at 30° C. Comparable results are obtained at 2C charge and discharge rates. A person of ordinary skill in the art will recognize that additional ranges within the explicit ranges above are contemplated and are within the present disclosure.

EXAMPLES

General Methods and Materials.

The electrolyte formulations were tested through their incorporation into coin cells using NMC positive electrodes and negative electrodes incorporating a blend of silicon oxide based composites and graphite as the active materials. Specifically, the active material for the positive electrodes were commercial lithium nickel manganese cobalt 30 oxides having the formula $LiNi_{0.6}Mn_{0.2}Co_{0.2}O_2$ (NMC622) or $LiNi_{0.8}Mn_{0.1}Co_{0.1}O_2$ (NMC811). The negative electrode active material was a commercial SiO—Si—C (SiOx) composite that was blended with electrochemically active graphite.

To form the negative electrode with the silicon oxide based active material, the active material was formed, unless otherwise noted, by blending 65 wt % to 80 wt % of a powder of commercial silicon oxide/silicon/carbon composite material (referred to herein as $SiO_x/Si/C$) and the balance (20 wt % to 35 wt %) of graphite (KS 6 synthetic graphite, Imerys. The negative electrode active material was mixed thoroughly with from 1 wt % to 7 wt % of a nanoscale carbon electrically conductive additive to form a homogeneous powder mixture. The negative electrode's had 2-6 wt % carbon nanotubes as a conductive additive. The powder components of the electrode, active material and carbon nanotubes, were mixed to form a homogeneous powder mixture. The negative electrode had from 1-7 wt % lower elastic modulus binder and 7-15% polyimide. The lower elastic modulus binder to polyimide weight ratios was 0.714.

To form the negative electrode, a blend of polymer binders, polyimide binder and lower elastic modulus binder, was mixed with N-methyl-pyrrolidone ("NMP") (Sigma-Aldrich) and stirred overnight to form a polymer binder-NMP solution. The homogenous powder mixture was then added to the polymer binder-NMP solution and mixed for about 2 hours to form a homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained from 2 to 20 wt % binder with the remainder of the electrode contributed by the powders. The negative electrodes were electrochemically pre-lithiated with sufficient lithium to compensate for 100% to 160% of the loss of lithium due to the anode irreversible capacity loss.

The positive electrode had a loading of active material from about 93 wt % to 97.5 wt % blended with 1 wt % to 4 wt % pvdf binder, and 1 wt % to 3 wt % nanoscale carbon. The cathode material was blended with NMP solvent, spread onto an aluminum foil current collector, pressed, and dried.

To form the coin cells, a section of negative electrode was cut to size along with separator, and a section of positive electrode was also cut to size. The separator for these cells was a Celgard® porous polymer membrane. The electrodes with the separator between them was placed in a coin cell enclosure. An electrolyte selected as described below was placed in the cell and the cell was sealed.

The assembled cells were cycled at 23° C. between 4.3V and 2.5V for the NMC622 cells and between 4.2V and 2.5V for the NMC811 cells. The cell was in the first cycle charged and discharged at a rate of C/10, in the second cycle at a C/5 rate, followed by cycling at a C/3 rate.

Examples 8 and 9 are directed to pouch cells, and the formation of these cells is described further below.

Example 1—Cells with NMC Positive Electrodes and Commercial Electrolyte

This Example demonstrates cycling performance in a coin cell with an NCM positive electrode active material, the blend of negative electrode active materials and a commercial electrolyte.

In a first set of cells, the negative electrode for these cells was as described in the Materials and Methods section above. The positive electrodes included either $LiNi_{0.8}Mn_{0.1}Co_{0.1}O_2$ (NMC811) or $LiNi_{0.6}Mn_{0.2}Co_{0.2}O_2$ (NMC622) as the positive electrode active material for the cells. Cells were formed with different loadings of positive electrode active material. The NMC 622 cells were cycled over either 4.30V to 2.5V or 4.35V to 2.5V, and the NMC 811 cells were cycled over the voltage range of 4.20V to 2.5V.

The initial charge discharge cycle was performed at a rate of C/10. The results for all of the samples are also summarized in Table 1.

TABLE 1

| Samples | Cathode Blend Material | Cathode Loading (mg/cm$^2$) | Activation Voltage | C/10 Charge | C/10 Discharge | C/10 Avg. V |
|---|---|---|---|---|---|---|
| C1 | NMC 622 | 21.7 | 2.5~4.30 V | 204 | 185 | 3.473 |
| C2 | | 21.9 | | 203 | 184 | 3.474 |
| C3 | | 22.0 | | 204 | 184 | 3.474 |
| C4 | | 22.2 | 2.5~4.35 V | 209 | 190 | 3.483 |
| C5 | | 22.3 | | 209 | 188 | 3.489 |
| C6 | NMC 811 | 21.7 | 2.5~4.20 V | 216 | 187 | 3.463 |
| C7 | | 21.7 | | 216 | 186 | 3.466 |
| C8 | | 21.8 | | 217 | 186 | 3.465 |

Also, the cells corresponding to Samples C1-C8 were cycled. Specifically, the cells were in the first cycle charged and discharged at a rate of C/10, in the second cycle at a C/5 rate, followed by cycling at a C/3 rate. The rate capability of the cell samples based on discharge capacities at specified discharge rates are summarized in Table 2.

TABLE 2

| Samples | Cycling Voltage | C/10 | C/5 | C/3 | C/3 Avg. V |
|---|---|---|---|---|---|
| C1 | 2.5~4.30V | 186 | 183 | 180 | 3.409 |
| C2 | | 186 | 183 | 180 | 3.412 |
| C3 | | 186 | 183 | 180 | 3.412 |
| C4 | 2.5~4.35V | 191 | 188 | 186 | 3.430 |
| C5 | | 189 | 185 | 183 | 3.434 |
| C6 | 2.5~4.20V | 193 | 189 | 186 | 3.416 |
| C7 | | 191 | 188 | 185 | 3.424 |
| C8 | | 192 | 189 | 186 | 3.422 |

Figure 5:
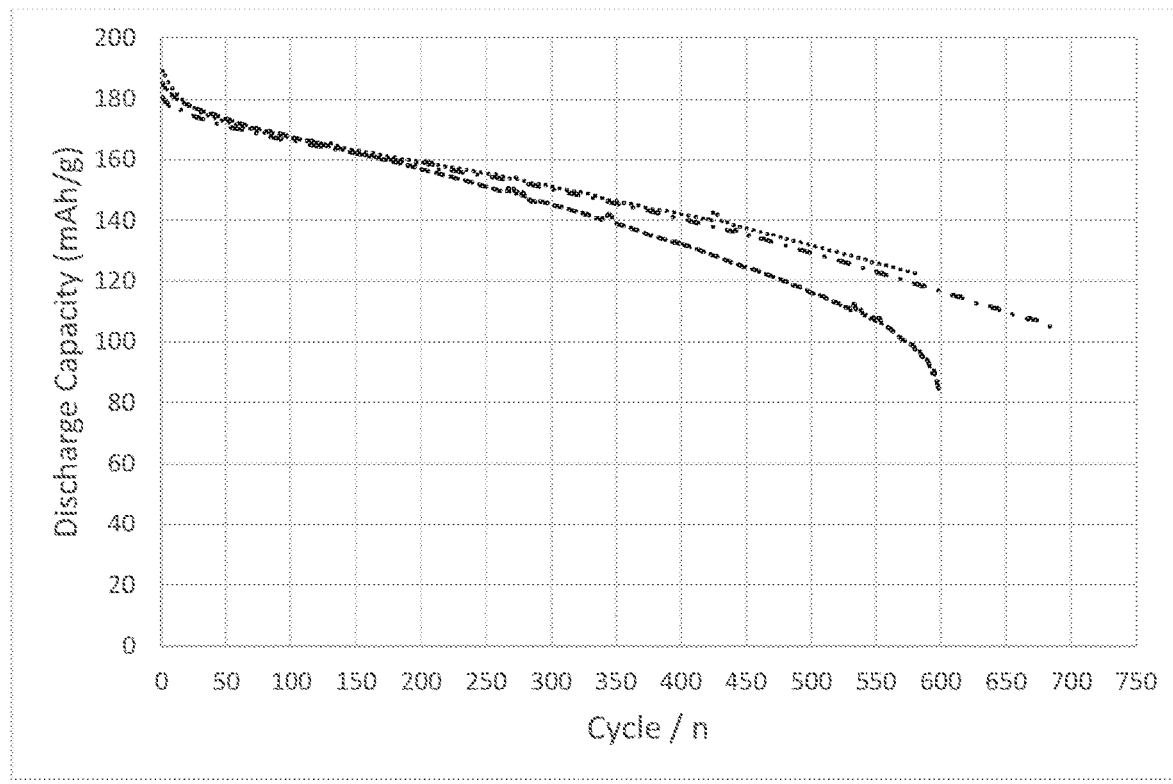
FIG. 5 is a set of plots of specific discharge capacity as a function of cycle number for three coin cell formats with negative electrodes with a blend of silicon oxide/carbon composite particles and graphite, and with positive electrodes with $LiNi_{0.6}Mn_{0.2}Co_{0.2}O_2$ (NMC622) or $LiNi_{0.8}Mn_{0.1}Co_{0.1}O_2$ (NMC811), which are cycled over a voltage window of (NMC622) 4.35V to 2.5V or 4.30V to 2.5V or (NMC811) 4.20V to 2.5V resulting in initial discharge capacities in the order listed from highest to lowest.
Figure 6:
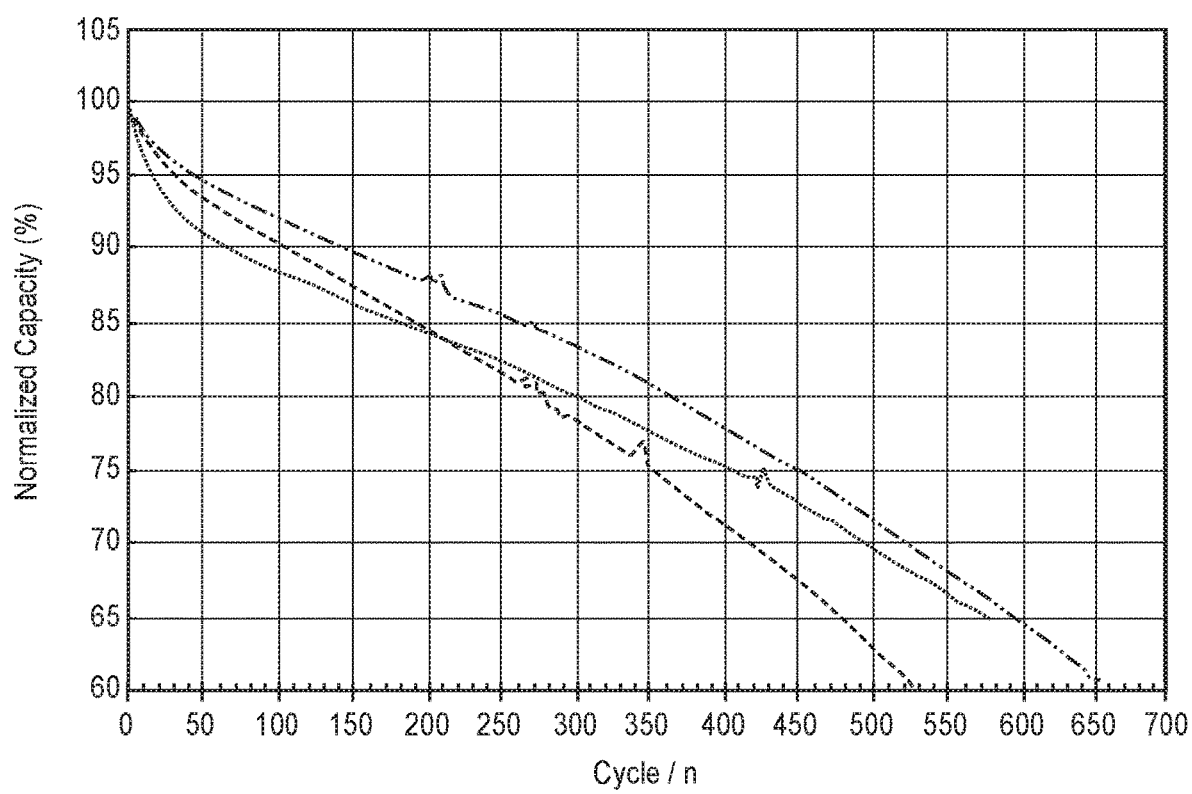
FIG. 6 is a set of plots of normalized specific discharge capacity as a function of cycle number for the three coin cells used to generate the results plotted in FIG. 5.

The discharge capacity as a function of cycle is plotted in FIG. 5 for samples C2, C4 and C7, and the normalized capacities as a function of cycle are plotted in FIG. 6. The best cycling performance for these coin cells was the sample based on NMC622 cycled from 4.30V to 2.5V while the worst cycling performance over the full cycling range was based on NMC622 cycled from 4.35V to 2.5V.

Example 2—Electrolyte Formulations for Silicon Oxide Based Lithium Ion Cells

This Example provides a set of electrolyte formulations designed for silicon oxide based active materials used in conjunction with NMC active materials along with their ionic conductivity measurements.

Electrolyte Formulations.

Table 3 provides the electrolyte formulations having various lithium hexafluorophosphate (LiPF$_6$) concentrations and solvent content. The concentration of LiPF$_6$ and the weight percentage ranges of fluoroethylene carbonate (FEC), dimethyl carbonate (DMC), ethylmethyl carbonate (EMC), diethyl carbonate (DEC), fluorobenzene (FB), propylene carbonate (PC), 1,3-propane sulfate (PS), and ethyl carbonate (EC) for each electrolyte formulation are shown in the table (percent values being volume percent for the solvent), and conductivity measurements (25° C.) for each formulation are provided.

TABLE 3

| Electrolyte Formulotion | LiPF$_6$ | FEC | DMC | EMC | DEC | FB | PC | PS | EC | Conductivity mS/cm |
|---|---|---|---|---|---|---|---|---|---|---|
| #1 | 1.0M | FA | DM1 | 0 | 0 | 0 | 0-10% | 0 | 0 | 10.7 |
| #2 | 1.5M | FA | DM1 | 0 | 0 | 0 | 0-10% | 0 | 0 | 10.7 |
| #3 | 1.8M | FA | DM1 | 0 | 0 | 0 | 0-10% | 0 | 0 | 10 |
| #4 | A | 10% | DM2 | 0 | 20-50% | 0 | 0-10% | 0 | 0 | 7.4 |
| #5 | A | 15% | DM3 | 0 | 20-50% | 0 | 0-10% | 0 | 0 | 7.9 |
| #6 | A | 20% | DM4 | 0 | 20-50% | 0 | 0-10% | 0 | 0 | 8.4 |
| #7 | B | 20% | DM4 | 0 | 40% | 0 | 0 | 0 | 0 | 8.4 |
| #8 | B | FA | 0 | 0 | 95-70% | 0 | 0 | 0 | 0 | 5.6 |
| #9 | B | FA | 0 | EM1 | 0 | 0 | 0 | 0 | 0 | 8.0 |
| #10 | B | FA | 0 | EM2 | 20-50% | 0 | 0 | 0 | 0 | 6.8 |
| #11 | B | FA | DM4 | EM2 | 0 | 0 | 0 | 0 | 0 | 8.9 |
| #12 | B | FA | DM5 | 0 | 20-50% | 5% | 0 | 0 | 0 | 8.1 |
| #13 | B | FA | DM5 | 0 | 20-50% | 0 | 5% | 0 | 0 | 8.4 |
| #14 | B | FA | DM6 | 0 | 20-50% | 5% | 5% | 0 | 0 | 8.1 |
| #15 | B | 5% | 95% | 0 | 0 | 0 | 0 | 0 | 0 | 10 |
| #16 | B | 30% | 70% | 0 | 0 | 0 | 0 | 0 | 0 | 10.8 |
| #17 | B | 0 | 100% | 0 | 0 | 0 | 0 | 0 | 0 | 9.2 |
| #18 | B | 10% | 90% | 0 | 0 | 0 | 0 | 0 | 0 | 10.8 |
| Product 1 | >1M | yes | | | yes | yes | yes | yes | yes | 6.8 |
| Product 2* | 1.0M | yes | | | yes | | | yes | | 7.1 |

*Contains 25% fluorinated additive.
A = 1-1.25M, B = 1.3-1.75M
FA = 16%-25%
DM1 = 75%-85%, DM2 = 45% - 55%, DM3 = 40%-50%, DM4 = 35-45%, DM5 = 30%-40%, DM6 = 25%-35%, DM1 > DM2 > DM3 > DM4 > DM5 > DM6
EM1 = 75%-85%, EM2 = 30%-50%
DE1 = 30%-50%, DE2 = 75%-85%

Example 3—Rate Performance of Electrochemical Cells with Selected Electrolyte Formulations This example demonstrates the rate capabilities achievable with selected electrolytes from Example 2.

Coin cells were formed as described above in Example 1 except with electrolytes selected from Table 3. Table 4 shows the relationship between the electrolytes conductivity and rate performance for five electrolyte formulations of Table 3. The assembled cells were cycled after the first two formation cycles at different charge/discharge rates e.g., 0.333C/0.333C, 1C/1C, and 2C/1C for electrolyte formulation Nos. 1, 2, 3, 7 and 10.

TABLE 4

| Electrolyte formulation | 0.333C/0.333C mAh/g | 1C/1C mAh/g | 2C/1C mAh/g | Conductivity mS/cm |
|---|---|---|---|---|
| #1 | 176 | 169 | 163 | 10.7 |
| #2 | 177 | 171 | 164 | 10.7 |
| #3 | 174 | 167 | 159 | 10 |
| #7 | 174 | 166 | 159 | 8.4 |
| #10 | 173 | 166 | 157 | 6.8 |

Example 4—Electrolyte Dependence on Cycling Performance of NMC622/SiOx Lithium Ion Cells The cycling performance of coin cells based on various electrolyte formulations are described in this Example.

Effect of Ethylene Carbonate.

Figure 7:
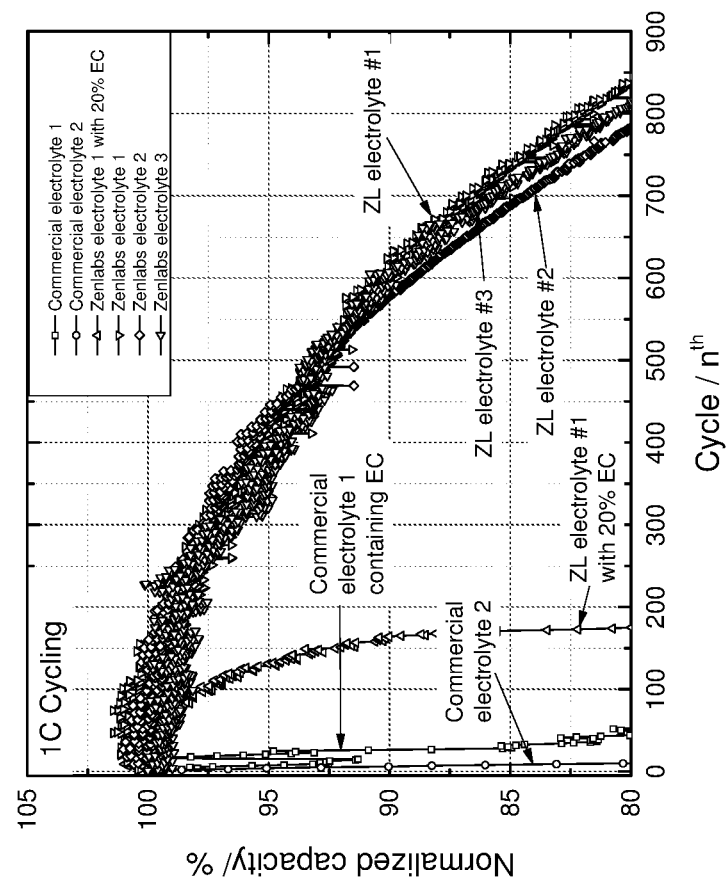
FIG. 7 is a plot of normalized capacity as a function of cycle number for coin cells cycled with charge/discharge rates of 1C with NMC622 positive electrode active material and SiOx composite/graphite mixed negative electrode active material formed with six different electrolytes with two including ethylene carbonate and four excluding ethylene carbonate.
Figure 8:
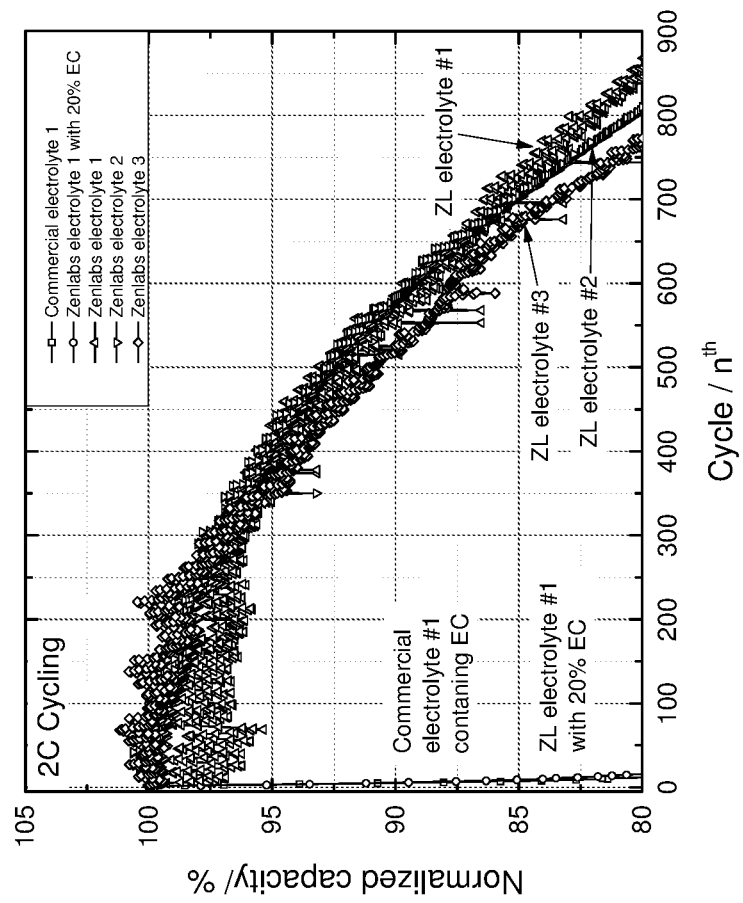
FIG. 8 is a plot of normalized capacity as a function of cycle number for five equivalent coin cells as used in FIG. 7 except with cycling at charge/discharge rates of 2C.

FIGS. 7 (1C/1C) and 8 (2C/2C) shows the detrimental effect on rate performance of a lithium ion battery system when the electrolyte formulation includes ethylene carbonate. The coin cells for this example are based on NMC622 positive electrode active materials. The negative electrodes and the coin cells were formed as described in Example 1. For example, for a coin cell with electrolyte No. 1 (Table 3), the rate performance of the system was significantly deteriorated after adding ethylene carbonate to the formulation. In comparison to the commercial electrolytes listed in Table 3 (Product 1 and Product 2), Formulation Nos. 1 and 2 containing 0% ethylene carbonate and exhibit superior performance at both 1C and 2C cycling. Electrolyte 1 exhibited somewhat better cycling performance relative to electrolyte 2.

Effect of Fluoroethylene Carbonate Concentration.

Figure 9:
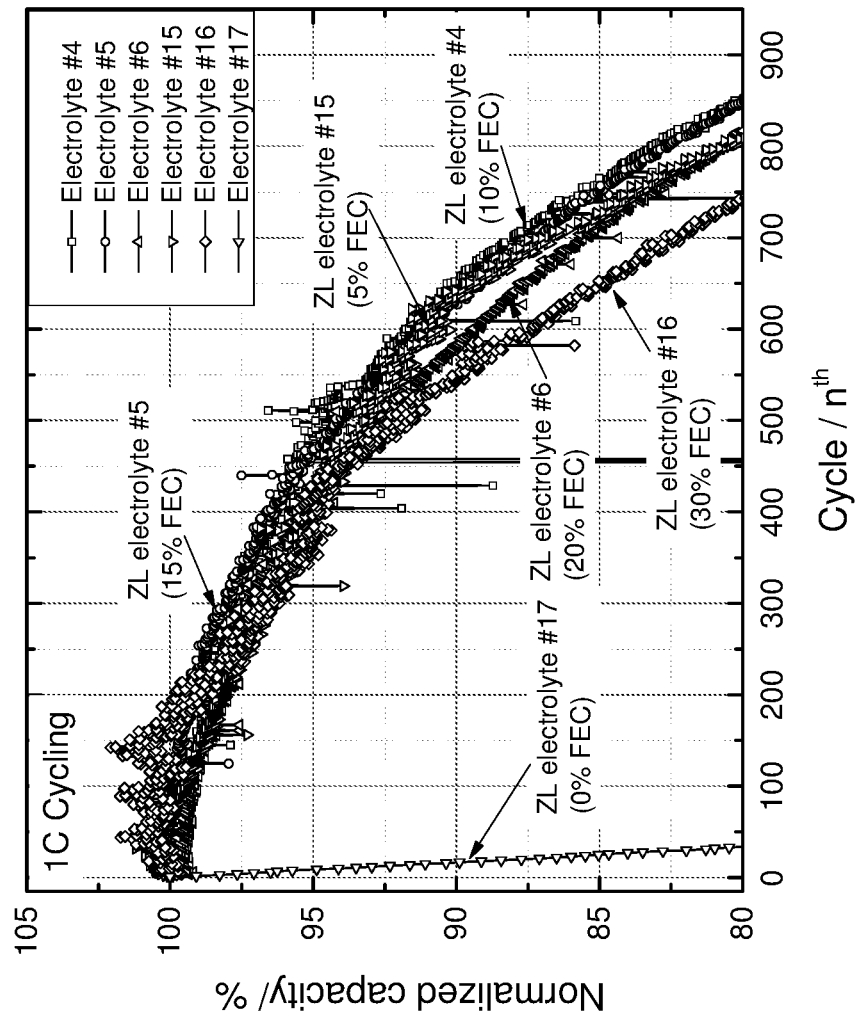
FIG. 9 is a plot of normalized capacity as a function of cycle number for coin cells cycled at charge/discharge rates of 1C, in which the cells were formed as indicated for FIG. 7 except with one of six electrolytes with varying amounts of fluoroethylene carbonate as indicated in Table 3.
Figure 10:
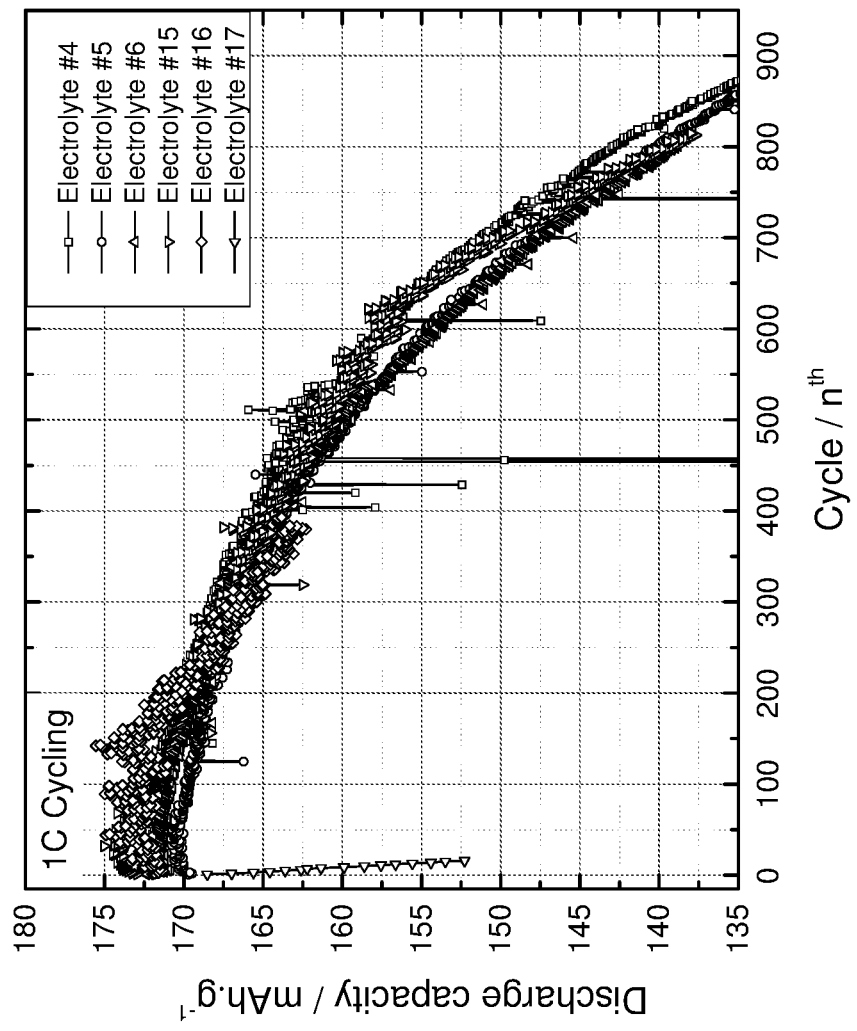
FIG. 10 is a plot of un-normalized specific capacities, referenced relative to the positive electrode active material weight, corresponding to the plots of FIG. 9.

FIGS. 9 and 10 shows the normalized (FIG. 9) and un-normalized (FIG. 10) 1C charging and discharging cycling performance of a coin cell comprising electrolyte formulations having amounts of fluoroethylene carbonate varying from 0% to 30% by volume. The data indicates that at least 5-10% of the FEC additive is required to obtain greater than 700 cycles to 80% capacity retention for silicon-based cells. The electrolytes with 10% or 15% FEC had the best cycling performance versus electrolytes with less or greater amounts of FEC. The electrolyte with no FEC cycled poorly.

Effect of Solvent.

Figure 11:
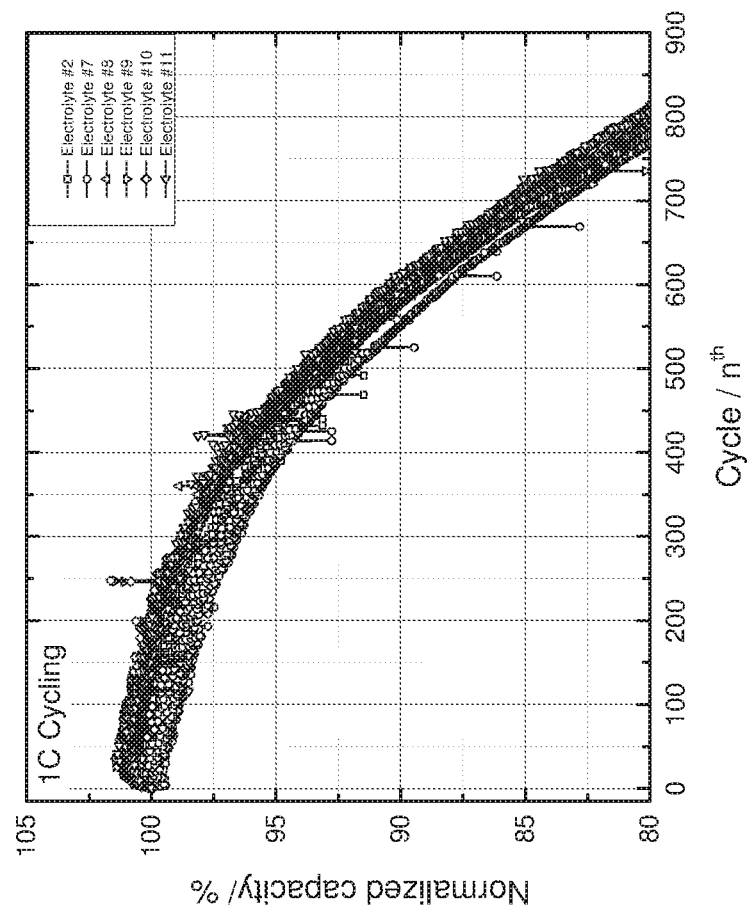
FIG. 11 is a plot of normalized capacities as a function of cycle number for coin cells cycled at charge/discharge rates of 1C, in which the cells were formed as indicated for FIG. 7 except that one of six electrolytes is used having varying amounts of dimethyl carbonate, ethylmethyl carbonate and diethyl carbonate solvent as noted in Table 3.
Figure 12:
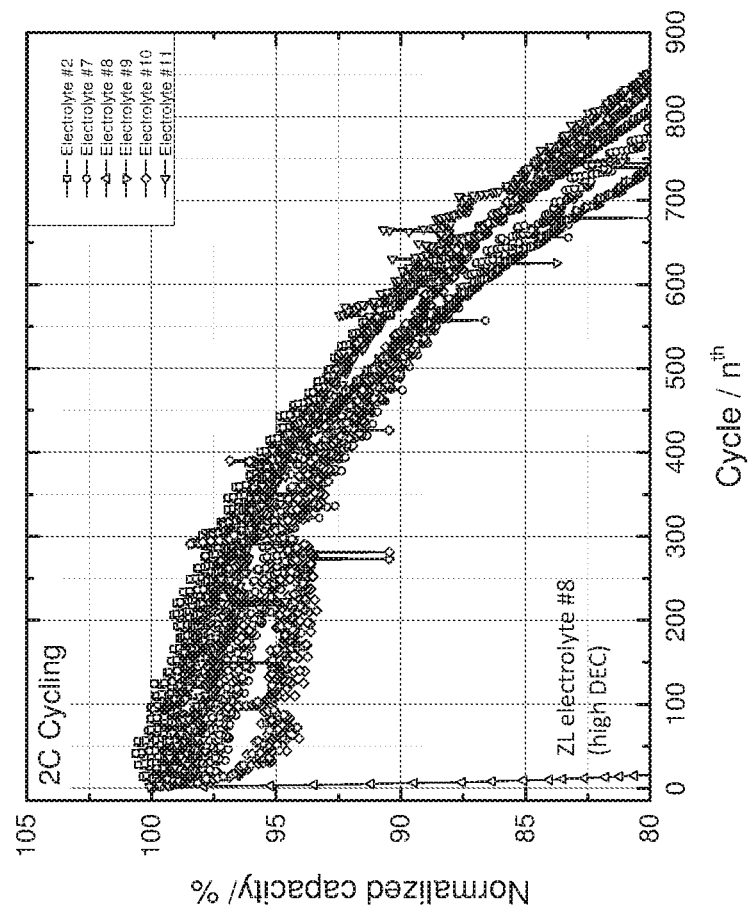
FIG. 12 is a plot of the normalized capacity as a function cycle number for equivalent coin cells as used for FIG. 11, in which the cells were cycled at a charge/discharge rate of 2C.

Varying amounts of dimethyl carbonate, ethylmethyl carbonate and diethyl carbonate in the electrolyte formulation for 1C cycling applications show relatively consistent performance in battery cycle life, e.g., 765-805 cycles at 80% capacity retention in a coin cell (FIGS. 11 (1C/1C) and 12 (2C/2C)), although the best results were obtained with at least some DMC and not too much DEC. However, for 2C cycling applications, cycling performance is affected more by different solvent ratios. For example, when the electrolyte comprises 70% DEC or greater, cycling performance is reduced. High weight percentages of either DMC or EMC do not adversely affect cycling performance, although the best results were obtained with some blend of the room temperature liquid solvent components, i.e., solvent components mixed with the FEC.

Effect of Solvent and Additives.

Figure 13:
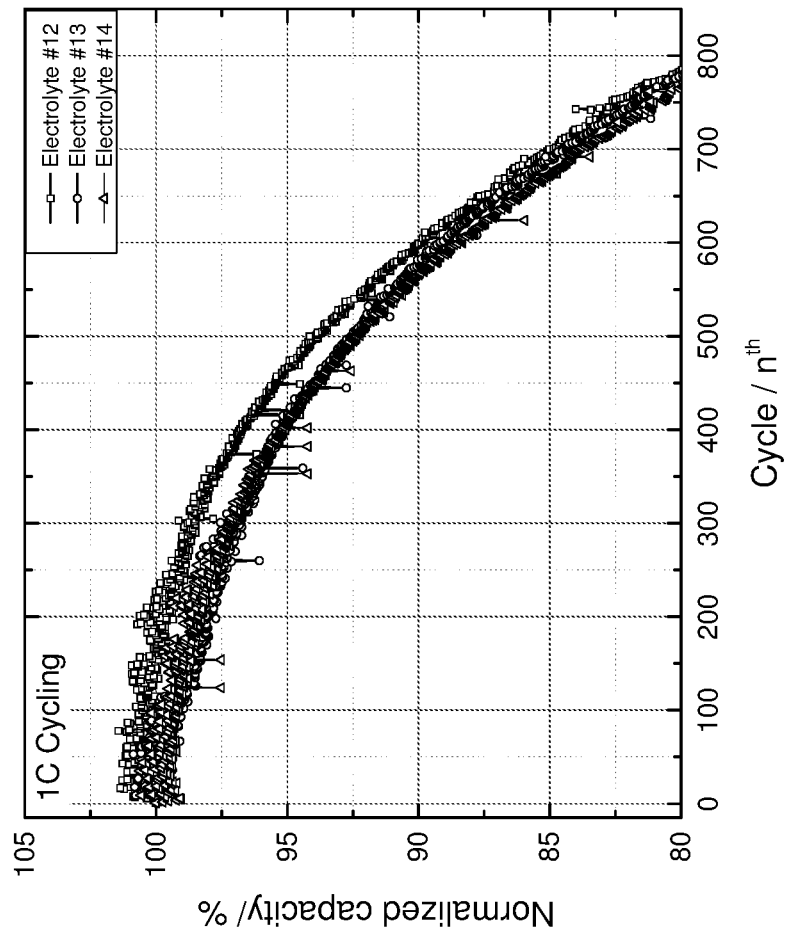
FIG. 13 is a plot of normalized capacity as a function of cycle number for coin cells cycled at charge/discharge rates of 1C, in which the cells were formed as indicated for FIG. 7 except that one of three electrolytes is used with optional additives.
Figure 14:
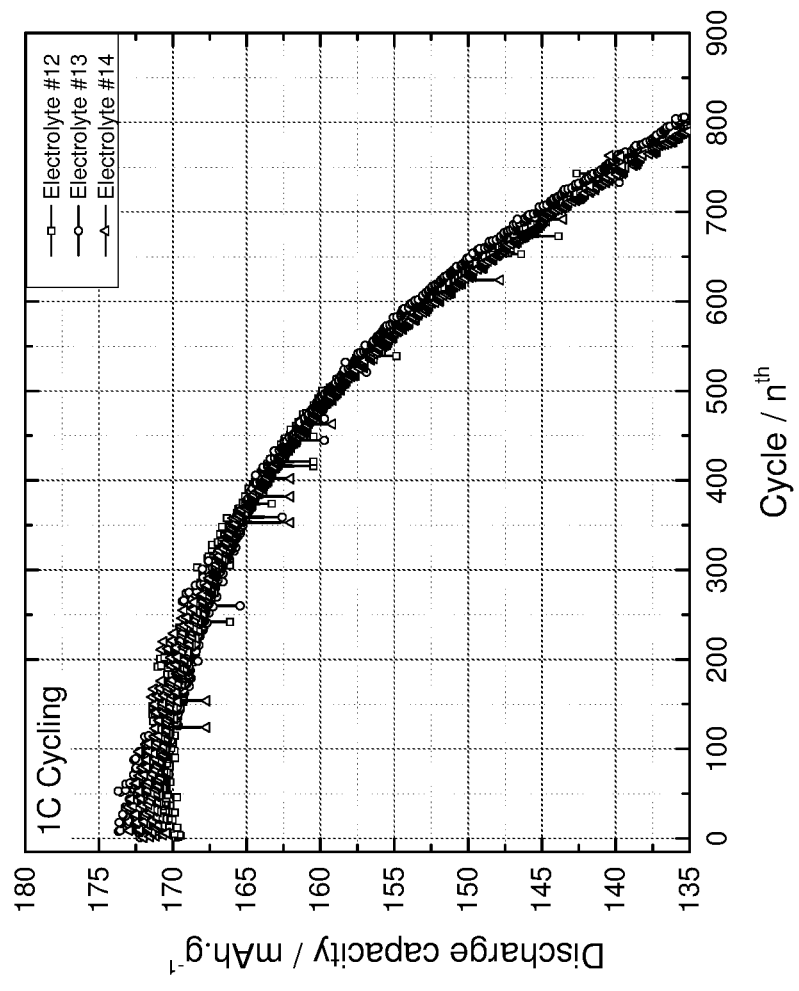
FIG. 14 is a plot of un-normalized specific capacities, referenced relative to the positive electrode active material weight, corresponding to the plots of FIG. 13.

The effects of fluorobenzene and propylene carbonate as additives were explored. These are noted as electrolytes 12-14 in Table 3. In all tested additive formulations, the coin cells showed consistent cycling performance, e.g., 770-780 cycles at 80% capacity retention (FIGS. 13 (normalized) and 14 (un-normalized capacity)). The results also were similar to the performance of Electrolyte 7, which is the closest electrolyte without additives, as shown in FIG. 11.

Example 5—Cycling Performance of NMC811/SiOx Coin Cells

This example shows the cycling performance with NMC811 active material in the positive electrode/cathode for one of the electrolytes developed for the silicon oxide based negative electrode active materials.

Figure 15:
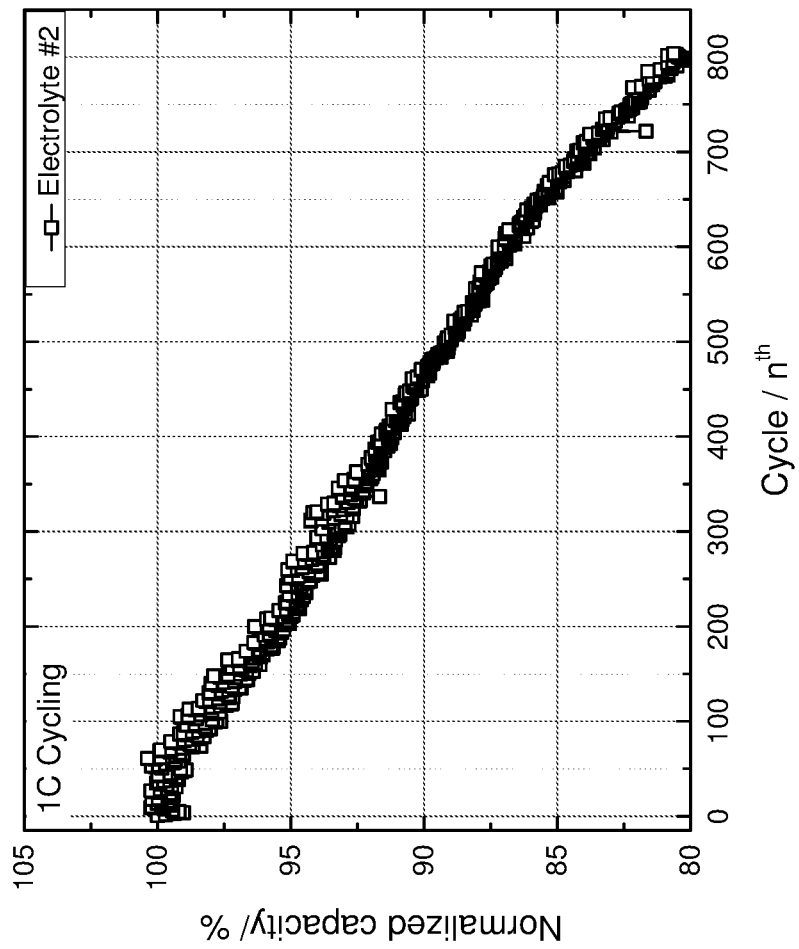
FIG. 15 is a plot of normalized capacity as a function of cycle number for coin cells formed with a NMC811 positive electrode active material and the same negative electrode as used in the cells for FIG. 7, in which the electrolyte was Electrolyte 2 of Table 3, with cycling performed at charge/discharge rates of 1C.
Figure 16:
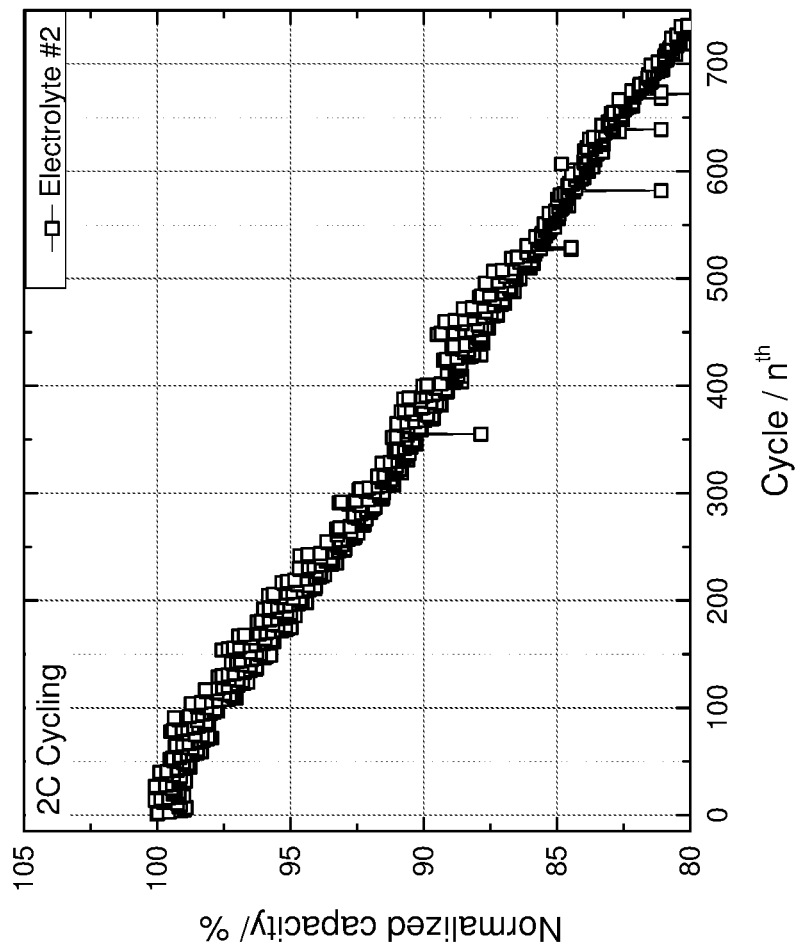
FIG. 16 is a plot of normalized capacity as a function of cycle number for equivalent coin cells as used for FIG. 15 with cycling performed at charge/discharge rates of 2C.

Electrolyte 2 was also used to cycle similar coin cells as described in Examples 1, 3 and 4 formulated with NMC811 positive electrode active material and an SiOx negative electrode. These cells were cycled from 2.5V to 4.2V. The cycling performance is shown in FIGS. 15 (1C/1C) and 16 (2C/2C). Both 1C and 2C coin cell applications provide a cycling performance of greater than 700 cycles to 80% capacity retention when Electrolyte 2 was used as the electrolyte. The cycling performance was comparable to the NMC622 results with a little better cycling for the NMC811 electrodes at 1C/1C and slightly worse cycling for the NMC811 electrodes at 2C/2C.

Example 6—Large Capacity Long Cycling Batteries with Commercial Electrolyte

This Example demonstrates long cycling stability based on improved negative electrodes loaded into large format batteries.

Figures 17, 18:
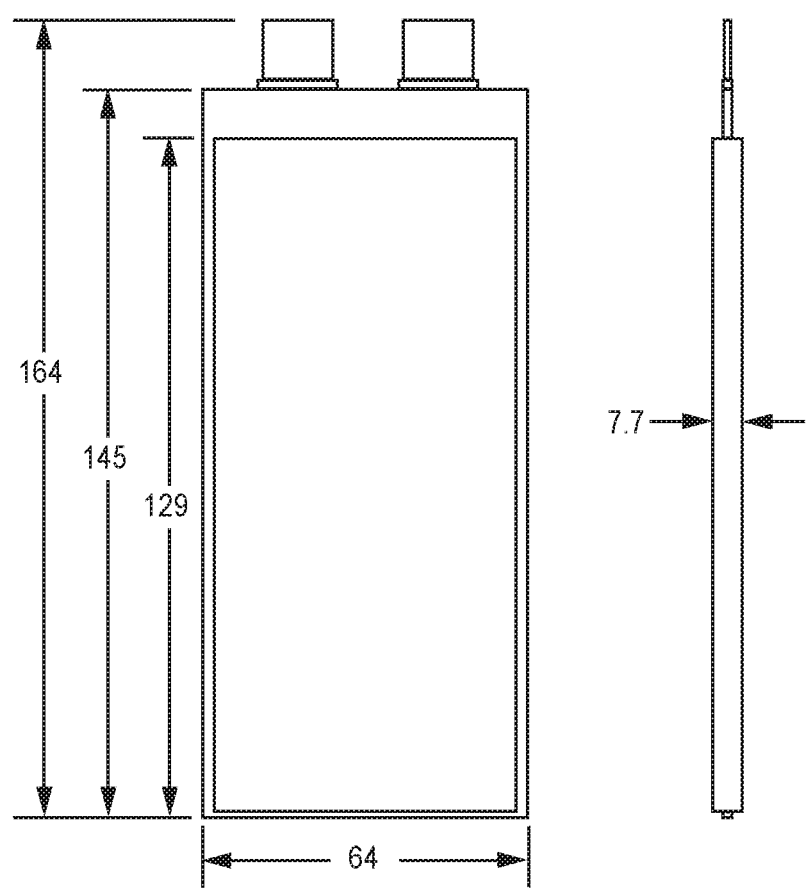
FIG. 17 is a front view diagram of a pouch cell designed for operation at roughly 11 Ah.
FIG. 18 is a side view diagram of the pouch cell of FIG. 17.

A pouch cell was designed with a target capacity of about 11 Ah. The prismatic shaped pouch cells had approximate dimensions, neglecting tabs, of 145 mm×64 mm×7.7 mm (thick). The cell design is shown in FIGS. 17 and 18. The electrodes were formed as described in the Materials and methods above, and a separator sheet was pleated with electrode plated placed within the separator folds. The separator for the pouch cells was a porous polymer composite sheet with a gel-forming polymer coating. Supplemental lithium was provided by applying lithium powder (SLMP®, Livent Corp.) to the negative electrode surface prior to assembly to roughly compensate for 100% to 160% of the IRCL of the silicon based negative electrode active material. The batteries were designed to have a total capacity of roughly 11 Ah at a discharge rate of C/3 at 30 degrees C. The batteries were cycled with one formation cycle at a charge and discharge rate of C/20. The cells were then cycled at 30 degrees C. with a charge rate and a discharge rate of C/3.

Figure 19:
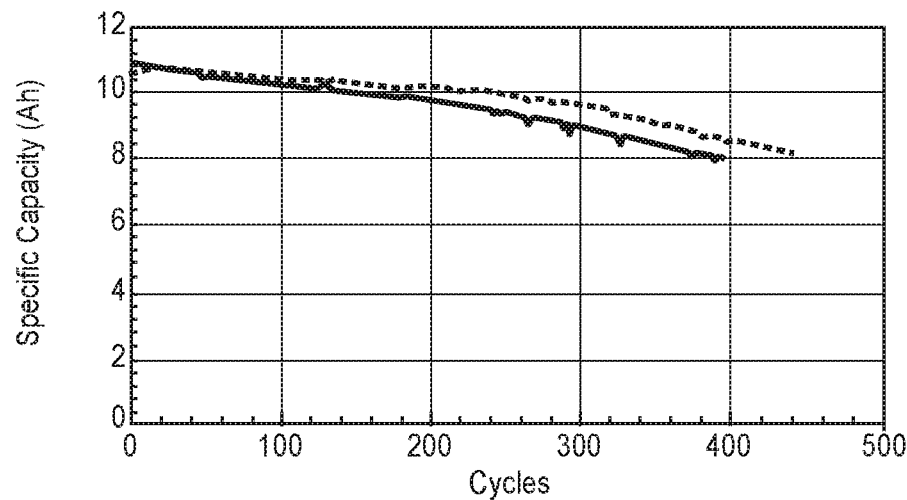
FIG. 19 is a plot of discharge capacity as a function of cycle number for two pouch cells using silicon oxide/carbon blended with graphite and NMC622 based positive electrode cycled over voltage windows of 4.3V to 2.3V.
Figure 20:
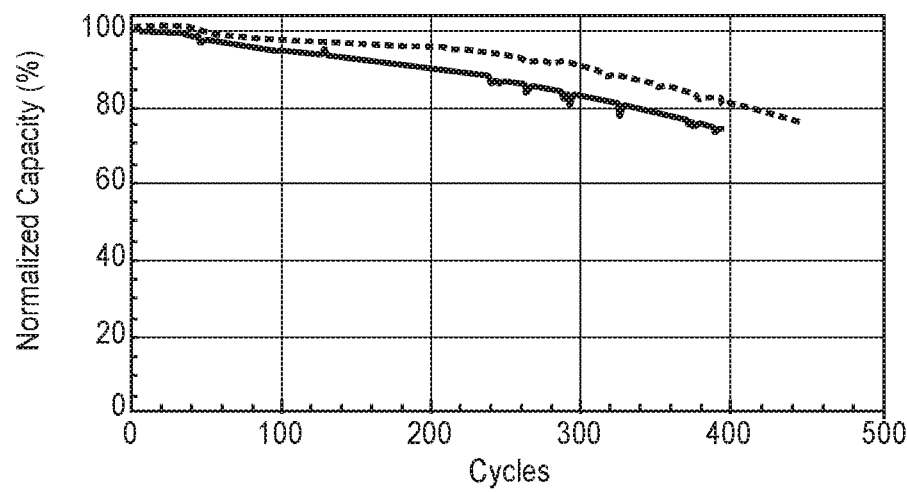
FIG. 20 is a plot of normalized discharge capacity as a function of cycle number for the two pouch cells used to generate the results in FIG. 19.

The 11 Ah cells were formed from the same anode as described above with the coin cells above with a NMC811 based positive electrode and from a NMC622 based positive electrode with an anode having an active material with 75-90 wt % $SiO_x$/Si/C composite and 10-25 wt % graphite. Based on low rate (C/20) capacities, the negative electrode capacity initially was from 130-160% of the positive electrode capacity. The negative electrode had a blend of polyimide and lower elastic modulus binders and carbon nanotubes conductive material. A commercial fluorinated electrolyte was also used. For the cells with the NMC622 positive electrodes, two comparable representative cells were cycled from 4.3V to 2.5V. The cycling results are plotted in FIGS. 19 and 20. In FIGS. 19 and 20, the specific capacity and normalized specific capacity are plotted as a function of cycle.

Figure 21:
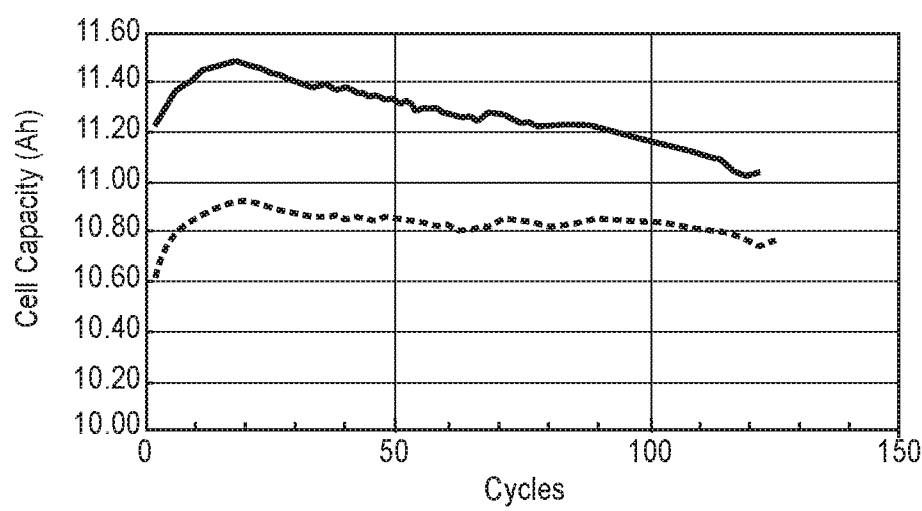
FIG. 21 is a plot of capacity as a function of cycle for cells using a positive electrode with NMC811 active material and an improved silicon oxide based anode as described herein.
Figure 22:
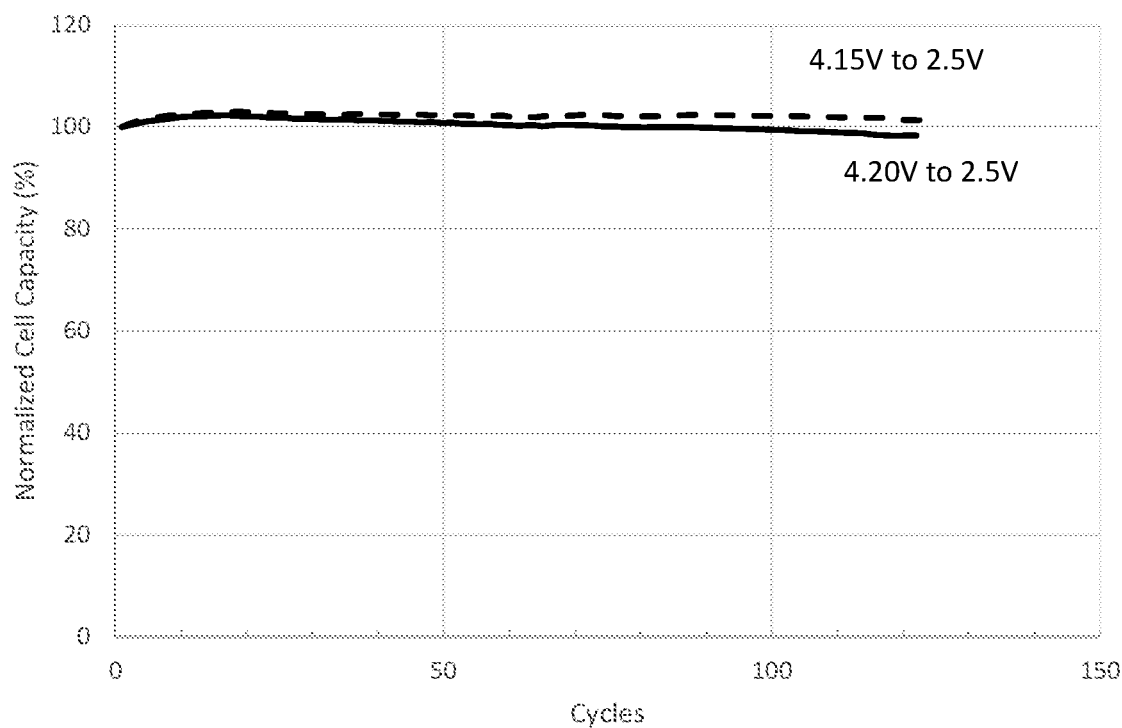
FIG. 22 a plot of normalized capacity as a function of cycle for the cells used to generate the plot for FIG. 21.

With respect to the cells with the NMC811 positive electrodes, comparable cells were cycled at a rate of C/3 from 4.15V to 2.5V and from 4.20V to 2.5V. The cycling results are plotted in FIGS. 21 and 22. In FIGS. 21 and 22, the specific capacity and normalized specific capacity are plotted as a function of cycle.

Example 7—Cycling Performance of NMC622/SiOx Pouch Cells with Improved Electrolytes This example explores the cycling performance of a pouch cell format with the silicon oxide based active material with the improved electrolytes described herein.

Figure 23:
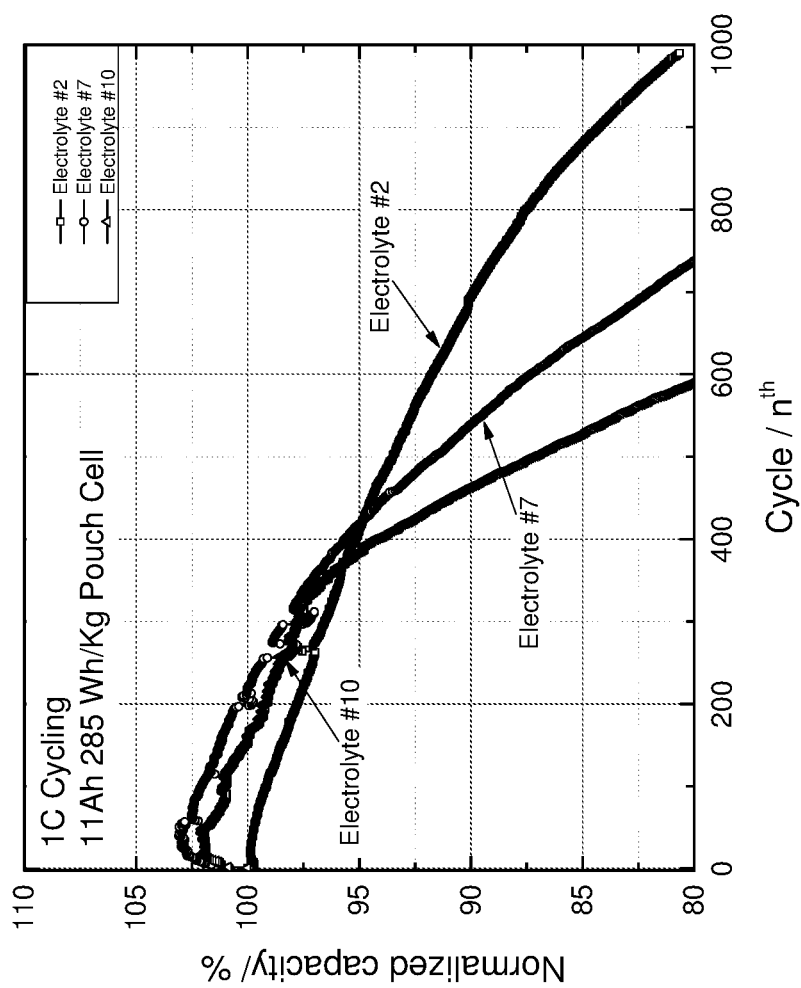
FIG. 23 is a plot of normalized capacity as a function of cycle number for pouch cells formed with a NMC622 positive electrode active material, SiOx composite graphite mixture negative electrode active material and one of three Electrolyte formulations from Table 3 with charge/discharge rates of 1C.
Figure 24:
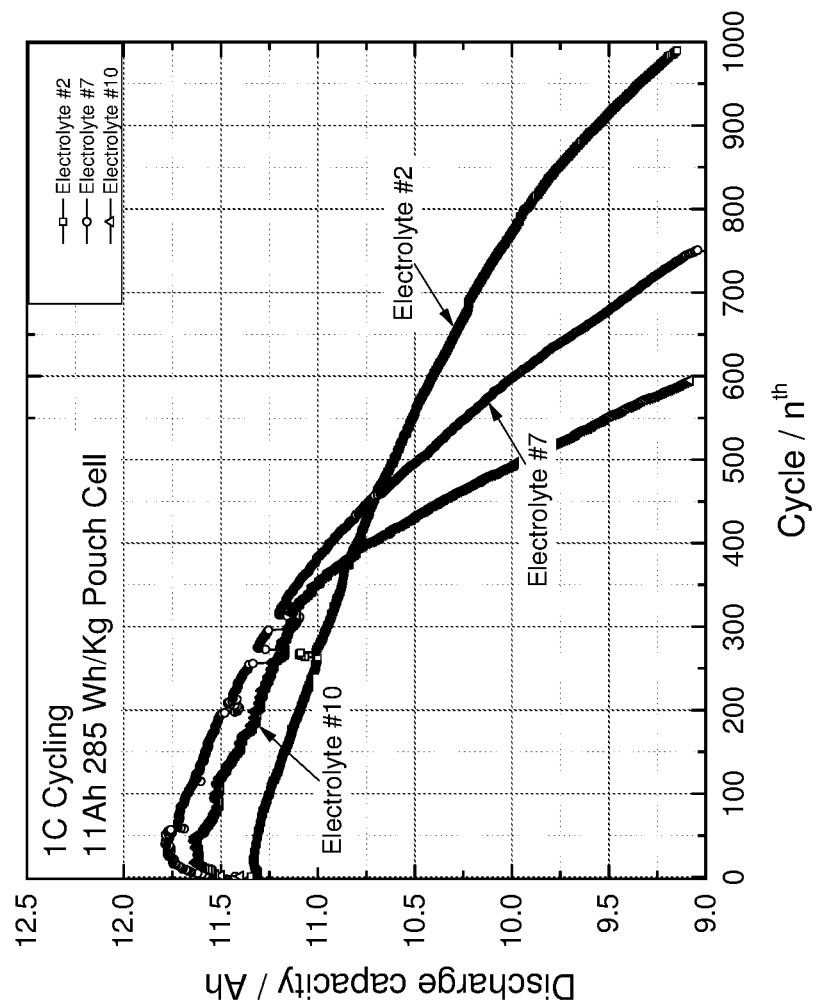
FIG. 24 is plot of discharge capacity as a function of cycle number for pouch cells used to generate FIG. 23.

The cycling performance of an NMC622/SiOx based 11 Ah 285 Wh/kg pouch cell was tested using three different electrolyte formulations from Table 3. The pouch cell construction is the same as described in Example 6, except that the electrodes for formulated as described above in the materials and methods section and the new electrolyte formulations were used. FIGS. 23 and 24 show the plots of normalized discharge capacity (FIG. 23) and un-normalized discharge capacity (FIG. 24) with Electrolytes 2, 7 and 10. Cells formed with Electrolyte 2 was shown to provide a cycling performance of greater than 1000 cycles to 80% capacity retention. For 1C pouch cell applications, when compared to formulations Nos. 7 and 10, this result indicates that a weight percentage of 70% or greater of DMC is preferable in electrolyte formulations comprising $LiPF_6$ and FEC.

Example 8—Blended Positive Electrode Active Materials

This example demonstrates the usefulness of the improved electrolytes for the cycling with cells having positive electrodes with blends of active material.

Positive electrodes were formed with a blend of nickel rich-lithium nickel manganese cobalt oxide (N-NMC) combined with lithium+manganese rich NMC (LM-NCM). It has been found that some LM-NMC compositions can exhibit relatively low DC resistance while maintaining a relatively high capacity and excellent cycling as described in U.S. Pat. No. 9,552,901B2 to Amiruddin et al. (hereinafter the '901 patent), entitled "Lithium Ion Batteries With High Energy Density, Excellent Cycling Capability and Low Internal Impedance," incorporated herein by reference. The negative electrode was the same as described in Example 2, and coin cells were formed as described in Example 2.

Figure 25:
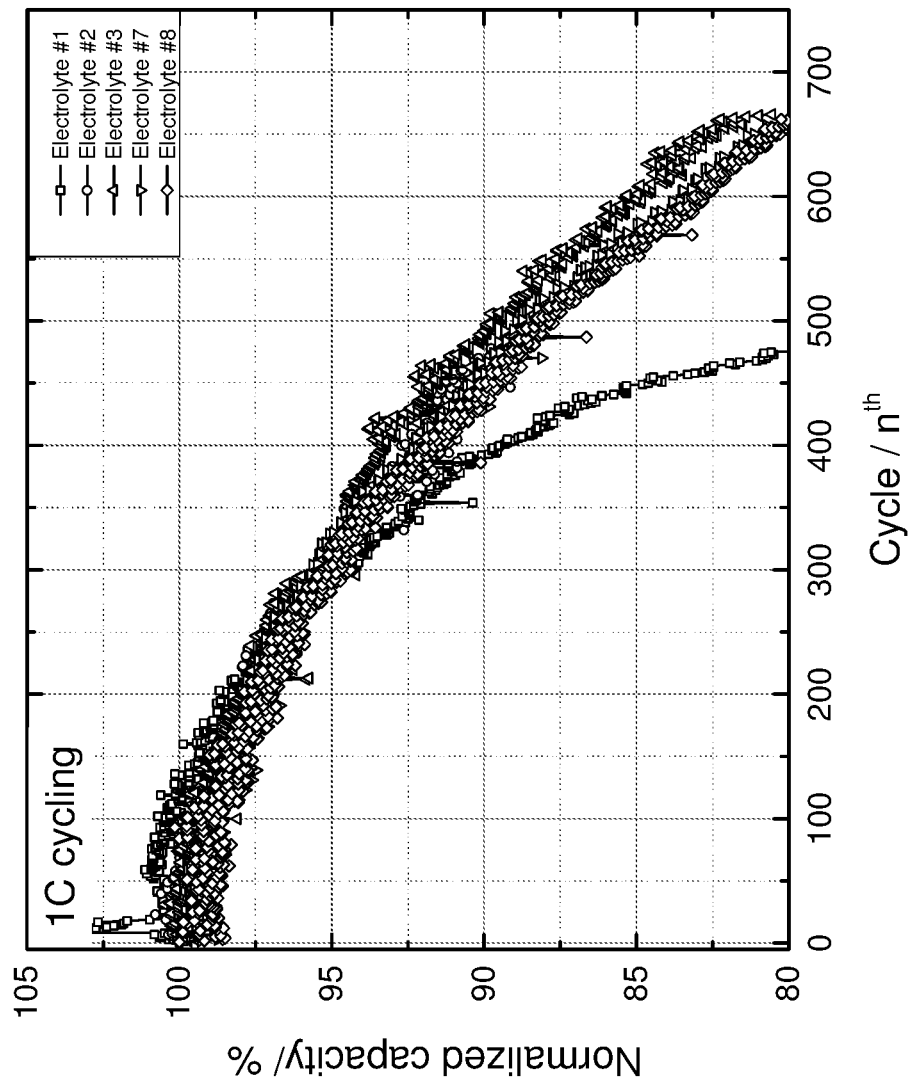
FIG. 25 is a plot of normalized discharge capacity as a function of cycle for coin cell formed with positive electrodes having a blend of nickel rich NCM and lithium and manganese rich NCM and with negative electrodes as used in Example, in which plots are presented for five different electrolytes.
Figure 26:
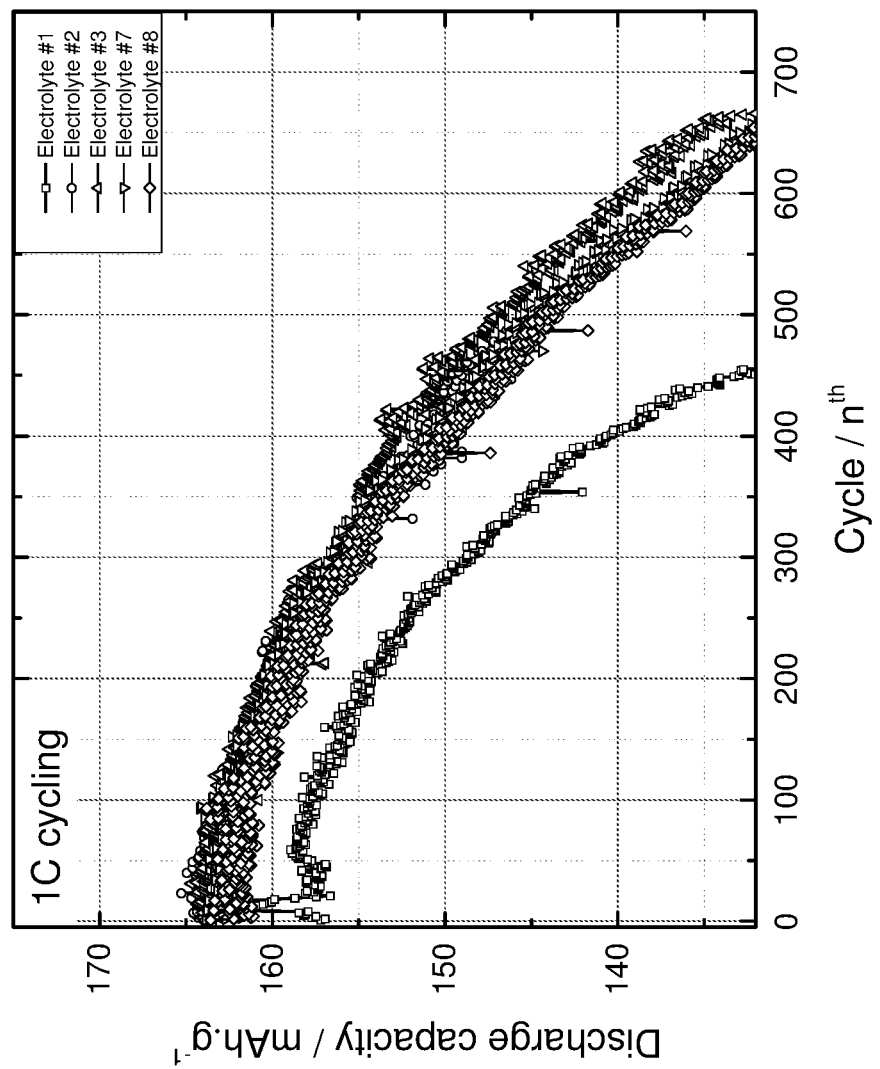
FIG. 26 is a plot of the un-normalized discharge capacities as a function of cycle for the cells use to generate FIG. 25.

Cycling results were obtained for cells with 5 different electrolytes from Table 3, specifically electrolytes 1, 2, 3, 7 and 8. The cells were cycled from 4.25V to 2.3V at rates after the first cycle of 1C/1C-charge/discharge. The cycling results are plotted in FIGS. 25 (normalized capacities) and 26 (un-normalized discharge capacities). Except for electrolyte 1, similar cycling results were obtained for the electrolytes. For all of the electrolytes, improved cycling was obtained relative to equivalent results obtained with commercial fluorinated electrolytes, see the '209 application cited above, with the results for electrolytes 2, 3, 7 and 8 being significantly better. The cycling results though were not as good as with the N-NMC based positive electrodes.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein. To the extent that specific structures, compositions and/or processes are described herein with components, elements, ingredients or other partitions, it is to be understand that the disclosure herein covers the specific embodiments, embodiments comprising the specific components, elements, ingredients, other partitions or combinations thereof as well as embodiments consisting essentially of such specific components, ingredients or other partitions or combinations thereof that can include additional features that do not change the fundamental nature of the subject matter, as suggested in the discussion, unless otherwise specifically indicated.

What is claimed is:

1. A lithium ion cell comprising:
a negative electrode comprising from about 87 wt % to about 92 wt % an active material, from about 1 wt % to about 7 wt % nanoscale conductive carbon and from about 6 wt % to about 20 wt % polymer binder, wherein the active material comprises from about 35 wt % to about 95 wt % silicon oxide-based material and from about 5 wt % to about 65 wt % graphite, and wherein the polymer binder has a tensile strength of at least about 60 MPa;
a positive electrode comprising a lithium nickel cobalt manganese oxide approximately represented by the formula $LiNi_xMn_yCo_zO_2$, where $x+y+z \approx 1$, $0.5 \le x$, $0.025 \le y \le 0.35$, $0.025 \le z \le 0.3$, conductive carbon, and a polymer binder;
supplemental lithium in an amount from about 60% to about 180% of the negative electrode first cycle irreversible capacity loss;
a separator between the negative electrode and the positive electrode;
electrolyte comprising from about 1.25M to about 2 M lithium salt and non-aqueous solvent, wherein the non-aqueous solvent comprises at least about 5 volume percent to about 20 volume percent fluoroethylene carbonate, and at least about 25 volume percent combined amount of dimethyl carbonate, and ethylmethyl carbonate, from about 20 volume percent to about 50 volume percent diethyl carbonate, wherein the electrolyte is substantially free of ethylene carbonate; and
a container enclosing the negative electrode, positive electrode, separator and electrolyte.

2. The lithium ion cell of claim 1 wherein the lithium ion cell can be cycled at a charge rate of 1C and a discharge rate of 1C for at least about 700 cycles without a drop in capacity of more than 20% relative to the 3rd cycle capacity.

3. The lithium ion cell of claim 1 wherein the negative electrode active material comprises from about 40 wt % to about 90 wt % silicon-oxide based material and from about 10 wt % to about 60 wt % graphite, wherein the graphite has a BET surface area from about 2 $m^2/g$ to about 100 $m^2/g$.

4. The lithium ion cell of claim 3 wherein the silicon oxide-based material comprises a silicon-silicon oxide carbon composite material.

5. The lithium ion cell of claim 1 wherein the polymer binder of the negative electrode comprises a blend of polyimide and a second binder polymer selected from the group consisting of poly vinylidene fluoride, carboxymethyl cellulose, styrene-butadiene rubber, lithiated polyacrylic acid, copolymers thereof and mixtures thereof.

6. The lithium ion cell of claim 1 wherein the electrolyte comprises from about 1.35 M to about 1.8 M lithium salt and wherein the non-aqueous solvent comprises from about 10 volume percent to about 18 volume percent fluoroethylene carbonate and at least about 50 volume percent combined amount of dimethyl carbonate, ethylmethyl carbonate, and diethyl carbonate.

7. The lithium ion cell of claim 1 wherein the electrolyte further comprises from about 2 wt % to about 12 wt % of propylene carbonate and from about 2 wt % to about 12 wt % of fluorobenzene.

8. The lithium ion cell of claim 1 wherein the lithium nickel manganese cobalt oxide is approximately represented by the formula $LiNi_xMn_yCo_zO_2$, where $x+y+z \approx 1$, $0.50 \leq x$, $0.03 \leq y \leq 0.325$, $0.03 \leq z \leq 0.275$.

9. The lithium ion cell of claim 1 further comprising supplemental lithium in an amount from about 80% to about 180% of the negative electrode first cycle irreversible capacity loss, the lithium ion cell having a ratio at the fourth cycle at a discharge rate of C/3 of negative electrode capacity divided by the positive electrode capacity from about 1.10 to about 1.95.

10. The lithium ion cell of claim 1 wherein the positive electrode further comprises from about 20 wt % to about 80 wt % of (lithium+manganese) rich lithium metal oxide represented by the formula $Li_{1+b}Ni_\alpha Mn_\beta Co_\gamma A_\delta O_{2-z}F_z$, where $b+\alpha+\beta+\gamma+\delta \approx 1$, b ranges from about 0.04 to about 0.3, α ranges from 0 to about 0.4, β range from about 0.2 to about 0.65, γ ranges from 0 to about 0.46, δ ranges from about 0 to about 0.15 and z ranges from 0 to 0.2, with the proviso that both α and γ are not 0, and where A is a metal different from lithium, manganese, nickel and cobalt.

11. The lithium ion cell of claim 1 wherein the nanoscale conductive carbon comprises carbon black and carbon nanotubes and/or carbon nanofibers.

12. The lithium ion cell of claim 1 wherein the polymer binder of the negative electrode comprises a blend of a first polymer having a Young's modulus greater than about 2.4 GPa and a second polymer having a Young's modulus of no more than about 2.4 GPa.

13. The lithium ion cell of claim 1 wherein the polymer binder of the negative electrode comprises a blend of at least about 50 wt % of a high tensile strength polymer having a tensile strength of at least about 60 MPa and at least about 5 wt % of a second polymer binder having a Young's modulus of no more than about 2.4 GPa.

14. The lithium ion cell of claim 13 wherein the blend has an elongation of at least about 35%.

15. The lithium ion cell of claim 1 wherein the positive electrode does not comprise an additional active material.

16. The lithium ion cell of claim 1 wherein the supplemental lithium is incorporated as a powder or foil in the negative electrode prior to assembly of the cell.

* * * * *